United States Patent
Mori et al.

(10) Patent No.: US 10,013,216 B2
(45) Date of Patent: Jul. 3, 2018

(54) STORAGE SYSTEM

(71) Applicant: Hitachi, Ltd., Tokyo (JP)

(72) Inventors: Nobuhito Mori, Tokyo (JP); Hirotaka Nakagawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 551 days.

(21) Appl. No.: 14/424,251

(22) PCT Filed: Feb. 17, 2014

(86) PCT No.: PCT/JP2014/053575
§ 371 (c)(1),
(2) Date: Feb. 26, 2015

(87) PCT Pub. No.: WO2015/121998
PCT Pub. Date: Aug. 20, 2015

(65) Prior Publication Data
US 2016/0019005 A1  Jan. 21, 2016

(51) Int. Cl.
*G06F 3/06* (2006.01)
*G06F 11/10* (2006.01)

(52) U.S. Cl.
CPC ............ *G06F 3/0685* (2013.01); *G06F 3/067* (2013.01); *G06F 3/0613* (2013.01);
(Continued)

(58) Field of Classification Search
None
See application file for complete search history.

(56) References Cited

U.S. PATENT DOCUMENTS

2001/0054093 A1* 12/2001 Iwatani ............... H04L 41/08
                                                             709/223
2002/0143999 A1* 10/2002 Yamagami ........... G06F 3/0605
                                                             709/249
(Continued)

FOREIGN PATENT DOCUMENTS

| JP | 2007-287064 A | 11/2007 |
| JP | 2008-065561 A | 3/2008 |
| JP | 2009-075718 A | 4/2009 |

OTHER PUBLICATIONS

Written Opinion of the International Searching Authority and International Search Report received in corresponding International Application No. PCT/JP2014/053575 dated Apr. 8, 2014.

*Primary Examiner* — Midys Rojas
*Assistant Examiner* — Khoa D Doan
(74) *Attorney, Agent, or Firm* — Mattingly & Malur, PC

(57) ABSTRACT

A storage system has a management computer and a storage device, where the storage device is connected to an external storage device and includes a first processor, a storage medium on which a plurality of logical storage devices is based, and a plurality of ports. The management computer includes a memory and a second processor, the memory storing port information, path information between host and storage device indicating the association between a host computer and the plurality of logical storage devices and ports, and path information between storage devices indicating the association between the external storage device and the plurality of logical storage devices and ports. The second processor executes band accommodation processing on either a path between host and storage device or a path between storage devices on the basis of the port information, the path information between host and storage device, and the path information between storage devices.

8 Claims, 27 Drawing Sheets

(52) U.S. Cl.
 CPC ......... *G06F 3/0635* (2013.01); *G06F 3/0647* (2013.01); *G06F 11/1076* (2013.01)

(56) References Cited

U.S. PATENT DOCUMENTS

| | | | |
|---|---|---|---|
| 2003/0135609 A1* | 7/2003 | Carlson | G06F 9/5011 709/224 |
| 2004/0076154 A1* | 4/2004 | Mizutani | H04L 45/00 370/389 |
| 2005/0210098 A1* | 9/2005 | Nakamichi | G06F 3/0607 709/203 |
| 2006/0101214 A1* | 5/2006 | Mikami | G06F 11/2058 711/162 |
| 2006/0179188 A1* | 8/2006 | Mimatsu | G06F 3/0617 710/65 |
| 2007/0016681 A1* | 1/2007 | Suzuki | G06F 3/0617 709/227 |
| 2007/0248017 A1* | 10/2007 | Hinata | G06F 3/061 370/238 |
| 2008/0059697 A1 | 3/2008 | Sakaki et al. | |
| 2008/0228987 A1* | 9/2008 | Yagi | G06F 3/0614 710/316 |
| 2009/0204743 A1* | 8/2009 | Inoue | G06F 11/201 711/100 |

* cited by examiner

FIG. 2
(a)
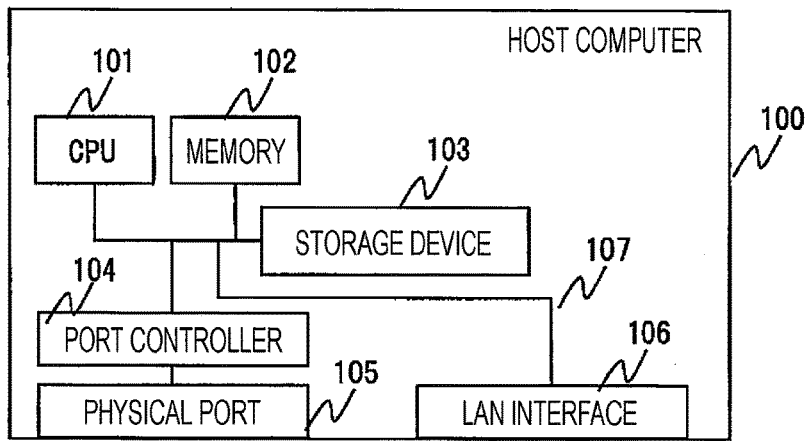
(b)
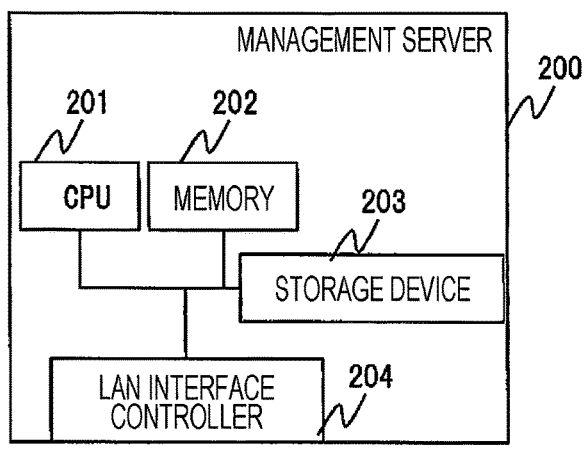
(c)
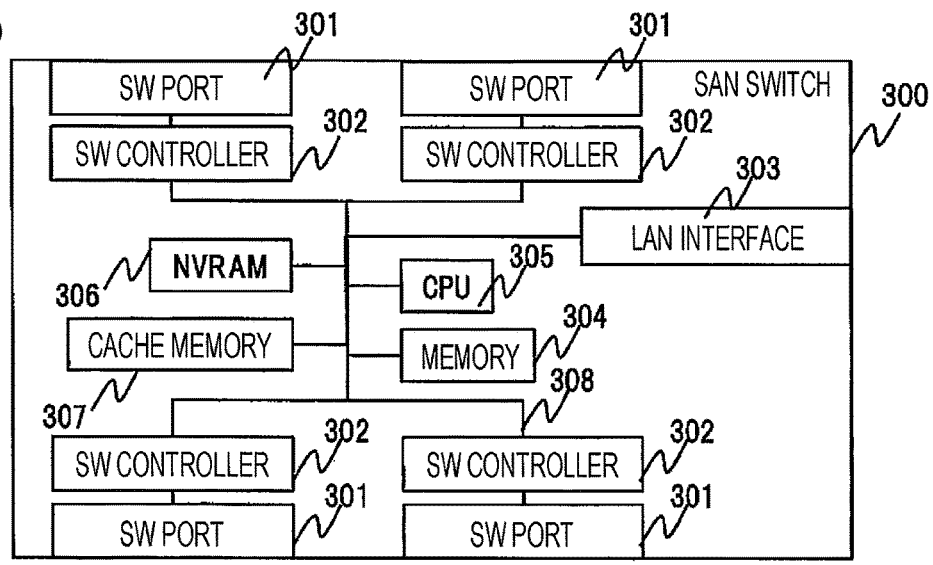

FIG. 8

PHYSICAL PORT INFORMATION 600

| PHYSICAL PORT NUMBER | PHYSICAL PORT WWN | Port_ID | ATTRIBUTE | CURRENT LOAD (Gbps) | ALLOWABLE LOAD (Gbps) | USE STATUS |
|---|---|---|---|---|---|---|
| Port1 | WWN1 | Port_ID1 | Target | 1.9 | 8.0 | IN USE |
| Port2 | WWN2 | Port_ID2 | External | 4.0 | 4.0 | IN USE |
| Port3 | WWN3 | Port_ID3 | Target | 0.0 | 8.0 | NOT IN USE |
| Port4 | WWN4 | Port_ID4 | RCU Target | 3.0 | 4.0 | IN USE |
| Port5 | WWN5 | Port_ID5 | Initiator | 2.0 | 16.0 | IN USE |

FIG. 9

PATH INFORMATION BETWEEN HOST AND STORAGE DEVICE 700

| LDEV ID | PHYSICAL PORT NUMBER | LUN | HOST PORT WWN | CURRENT LOAD (Gbps) |
|---|---|---|---|---|
| LDEV1 | Port1 | LU0 | HostWWN1 | 0.1Gbps |
| LDEV2 | Port1 | LU1 | HostWWN2 | 0.5Gbps |
| LDEV3 | Port2 | LU0 | HostWWN1 | 0.3Gbps |
| LDEV2 | Port2 | LU3 | HostWWN2 | 0.3Gbps |

FIG. 10

PATH INFORMATION BETWEEN STORAGE DEVICES 800

(a) DATA MIGRATION PATH (ON SIDE OF STORAGE DEVICE BEING MIGRATION DESTINATION) INFORMATION 810

| OWN STORAGE DEVICE INFORMATION 801A | | | EXTERNAL STORAGE DEVICE INFORMATION 802A | |
|---|---|---|---|---|
| LDEV ID | PHYSICAL PORT NUMBER | CURRENT LOAD (Gbps) | PORT WWN | LUN |
| LDEV1 | Port3 | 0.5 | WWN6 | LU1 |
| LDEV2 | Port4 | 1.3 | WWN7 | LU3 |
| 811 | 812 | 813 | 814 | 815 |

(b) DATA MIGRATION PATH (ON SIDE OF STORAGE DEVICE BEING MIGRATION SOURCE) INFORMATION 820

| OWN STORAGE DEVICE INFORMATION 801B | | | | EXTERNAL STORAGE DEVICE INFORMATION 802B |
|---|---|---|---|---|
| LDEV ID | PHYSICAL PORT NUMBER | LUN | CURRENT LOAD (Gbps) | PORT WWN |
| LDEV5 | Port5 | LU1 | 2.0 | WWN8 |
| LDEV8 | Port6 | LU0 | 1.5 | WWN9 |
| 821 | 822 | 823 | 824 | 825 |

(c) REMOTE COPY PATH INFORMATION 830

| OWN STORAGE DEVICE INFORMATION 801C | | | EXTERNAL STORAGE DEVICE INFORMATION 802C | |
|---|---|---|---|---|
| LDEV ID | PHYSICAL PORT NUMBER | CURRENT LOAD (Gbps) | PORT WWN | LDEV ID |
| LDEV6 | Port2 | 2.4 | WWN5 | LDEV4 |
| LDEV9 | Port7 | 1.6 | WWN6 | LDEV5 |
| 831 | 832 | 833 | 834 | 835 |

FIG. 22

(a) RSG INFORMATION 1500

| RSG ID | VIRTUAL S/N | LDEV COUNT | PORT COUNT |
|---|---|---|---|
| RSG#0 | - | 10000 (max:65536) | 100 (max:256) |
| RSG#1 | 12345 | 1000 (max:9000) | 50 (max:100) |
| RSG#2 | 67890 | 50 (max:100) | 10 (max:10) |
| 1501 | 1502 | 1503 | 1504 |

(b) VIRTUAL PORT INFORMATION 1600

| PHYSICAL PORT NUMBER | AFFILIATED RSG | VIRTUAL PORT NUMBER | VIRTUAL PORT WWN | CURRENT LOAD (Gbps) | ALLOWABLE LOAD (Gbps) |
|---|---|---|---|---|---|
| Port1 | RSG#1 | vPort1 | vWWN1 | 0.5 | 1.0 |
|  |  | vPort2 | vWWN2 | 0.5 | 2.0 |
| Port2 | RSG#2 | vPort1 | vWWN3 | 0.3 | 2.0 |
|  |  | vPort3 | vWWN4 | 0.3 | 8.0 |
|  |  | vPort4 | vWWN5 | 0.5 | 3.0 |
| 1601 | 1602 | 1603 | 1604 | 1605 | 1606 |

FIG. 23

PATH INFORMATION BETWEEN HOST AND STORAGE DEVICE 1700

| LDEV ID | VIRTUAL PORT NUMBER | LUN | HOST PORT WWN | CURRENT LOAD (Gbps) |
|---------|---------------------|-----|---------------|---------------------|
| LDEV1   | vPort1              | LU0 | HostWWN1      | 0.1Gbps             |
| LDEV2   | vPort1              | LU1 | HostWWN2      | 0.5Gbps             |
| LDEV3   | vPort2              | LU0 | HostWWN1      | 0.3Gbps             |
| LDEV2   | vPort2              | LU3 | HostWWN2      | 0.3Gbps             |
| 1701    | 1702                | 1703| 1704          | 1705                |

FIG. 24

PATH INFORMATION BETWEEN STORAGE DEVICES 1800

(a) DATA MIGRATION PATH (ON SIDE OF STORAGE DEVICE BEING MIGRATION DESTINATION) INFORMATION 810

| OWN STORAGE DEVICE INFORMATION 801A | | | EXTERNAL STORAGE DEVICE INFORMATION 802A | |
|---|---|---|---|---|
| LDEV ID | PHYSICAL PORT NUMBER | CURRENT LOAD (Gbps) | PORT WWN | LUN |
| LDEV1 | Port3 | 0.5 | WWN6 | LU1 |
| LDEV2 | Port4 | 1.3 | WWN7 | LU3 |
| 811 | 812 | 813 | 814 | 815 |

(b) DATA MIGRATION PATH (ON SIDE OF STORAGE DEVICE BEING MIGRATION SOURCE) INFORMATION 820

| OWN STORAGE DEVICE INFORMATION 801B | | | | EXTERNAL STORAGE DEVICE INFORMATION 802B |
|---|---|---|---|---|
| LDEV ID | PHYSICAL PORT NUMBER | LUN | CURRENT LOAD (Gbps) | PORT WWN |
| LDEV5 | Port5 | LU1 | 2.0 | WWN8 |
| LDEV8 | Port6 | LU0 | 1.5 | WWN9 |
| 821 | 822 | 823 | 824 | 825 |

(c) REMOTE COPY PATH 1830

| OWN STORAGE DEVICE 1801C | | | EXTERNAL STORAGE DEVICE 1802C | |
|---|---|---|---|---|
| LDEV ID | VIRTUAL PORT NUMBER | CURRENT LOAD (Gbps) | PORT WWN | LDEV ID |
| LDEV6 | vPort2 | 2.4 | WWN5 | LDEV4 |
| LDEV9 | vPort7 | 1.6 | WWN6 | LDEV5 |
| 1831 | 1832 | 1833 | 1834 | 1835 |

STORAGE SYSTEM

TECHNICAL FIELD

The present invention relates to a storage system, particularly to path management.

BACKGROUND ART

As disclosed in JP 2007-287064 A (PTL 1), there is a technique of dynamically switching a path used by a host according to a load status on each path between the host and a storage device.

CITATION LIST

Patent Literature

PTL 1: JP 2007-287064 A

SUMMARY OF INVENTION

Technical Problem

In the conventional technique, path setting is changed according to the load status of a port used to connect the host and the storage device and a path using the port as a criterion. However, a storage system also includes a path connecting storage devices in order to provide a disaster recovery function and a function of migrating data in a storage. The convention technique thus has a problem that an available bandwidth, when it exists, of the port used to connect the storage devices or the like cannot be utilized.

Solution to Problem

There is provided a storage system in which a management computer and a storage device are connected, where the storage device is connected to an external storage device and includes a first processor, a storage medium on which a plurality of logical storage devices is based, and a plurality of ports. The management computer includes a memory and a second processor, the memory storing port information, path information between host and storage device indicating the association between a host computer and the plurality of logical storage devices and ports, and path information between storage devices indicating the association between the external storage device and the plurality of logical storage devices and ports. The second processor executes band accommodation processing on either a path between host and storage device or a path between storage devices on the basis of the port information, the path information between host and storage device, and the path information between storage devices when a new path is set between the host computer and the storage device or between the storage device and the external storage device.

Advantageous Effects of Invention

The band of the port in the storage can be used effectively by mutually accommodating the band between the path between host and storage device and the path between storage devices.

BRIEF DESCRIPTION OF DRAWINGS

FIGS. 2(a) to 2(c) are diagrams illustrating an example of a hardware system configuration of each of a host computer, a management server, and a SAN switch according to the first embodiment of the present invention.

FIG. 8 is a table illustrating an example of physical port information according to the first embodiment of the present invention.

FIG. 9 is a table illustrating an example of path information between host and storage device according to the first embodiment of the present invention.

FIGS. 10(a) to 10(c) are tables illustrating an example of path information between storage devices according to the first embodiment of the present invention.

FIGS. 22(a) and 22(b) are tables illustrating an example of each of resource group information and virtual port information according to the second embodiment of the present invention.

FIG. 23 is a table illustrating an example of path information between host and storage device according to the second embodiment of the present invention.

FIGS. 24(a) to 24(c) are tables illustrating an example of path information between storage devices according to the second embodiment of the present invention.

DESCRIPTION OF EMBODIMENTS

Embodiments of the present invention will now be described with reference to the drawings.

First Embodiment

A first embodiment according to the present invention will be described with reference to FIGS. 1 to 18.

Figure 1:
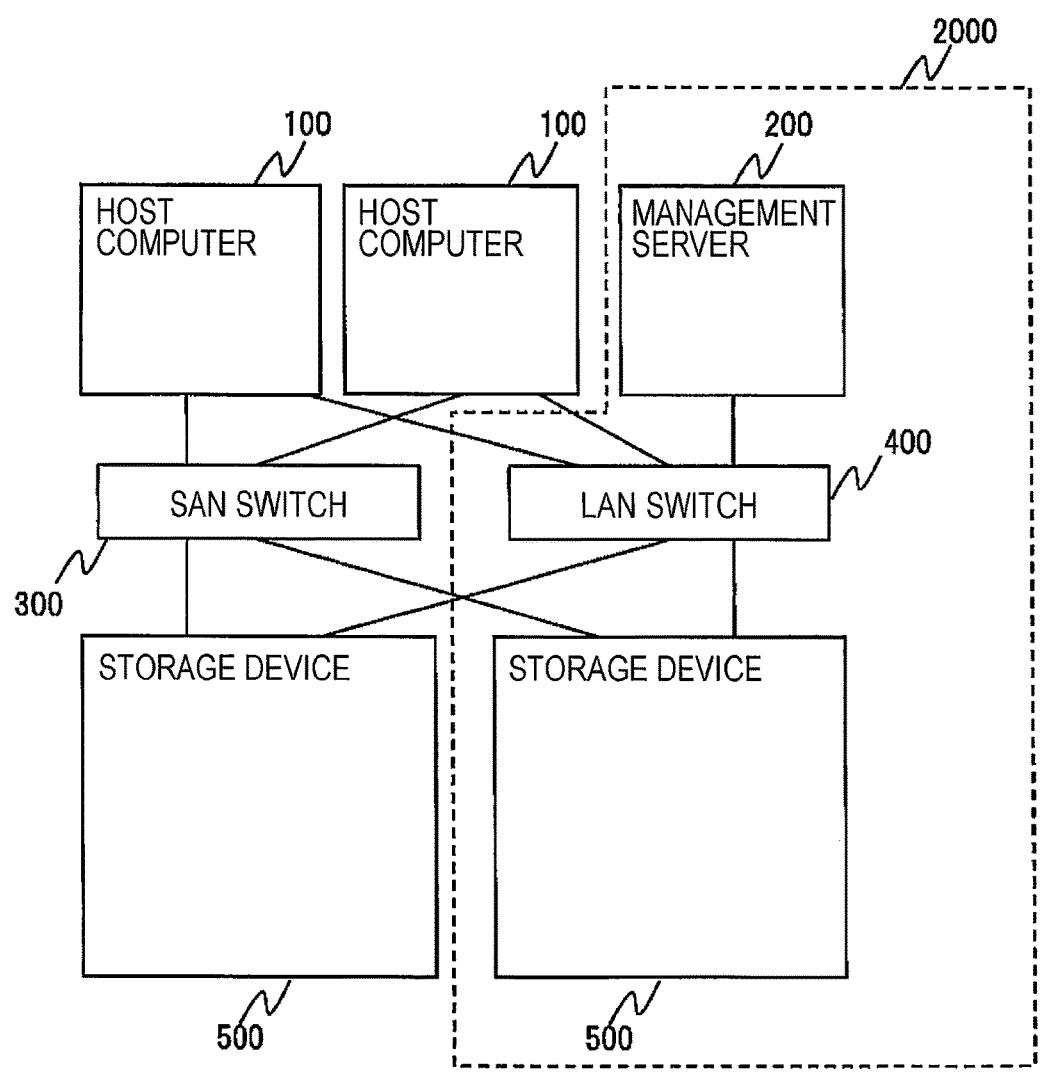
FIG. 1 is a diagram illustrating an example of a configuration of an IT system according to a first embodiment of the present invention.

FIG. 1 is a block diagram illustrating an overview of a system according to the present embodiment. The system includes a host computer 100, a management server 200, a SAN switch 300, a LAN switch 400, and a plurality of storage devices 500. The host computer 100, the management server 200, and the storage device 500 are connected to one another through the LAN switch 400. Moreover, the storage device 500 and the host computer 100 as well as the storages 500 are mutually connected by the SAN switch 300. Here, a system including the plurality of storage devices 500 and the management server 200 is considered a storage system 2000. Note that a plurality of the host computers 100 may be provided, in which case the host computers may be connected to one another by a data transfer LAN in addition to a management LAN 301. While the present description illustrates an example where the devices are connected to each other through the switch, the devices may also be connected to each other directly, not necessarily through the switch.

FIG. 2(a) illustrates an internal configuration of the host computer 100. The host computer 100 includes a CPU 101, a memory 102, a port controller 104, a physical port 105, a LAN interface 106, and a storage device 103, which are connected to one another by an internal bus 107. The host computer 100 is connected to the SAN switch 400 through the physical port 105. Moreover, the host computer 100 is connected to the LAN switch 400 through the LAN interface 106. Note that the storage device 103 does not necessarily have to be included. When the storage device 103 is not included, a volume in the storage device 500 is used as a storage area for software.

FIG. 2(b) illustrates an internal configuration of the management server 200. The management server 200 includes a CPU 201, a memory 202, a storage device 203, and a LAN interface 204. The management server 200 is connected to the LAN switch 400 through the LAN interface 204.

FIG. 2(c) illustrates an internal configuration of the SAN switch 300. The SAN switch 300 is an FC (Fiber Channel) switch, for example. The SAN switch 300 includes a switch port 301 (SW port in FIG. 2(c)), a switch controller 302 (SW controller in FIG. 2(c)), a memory 304, a CPU 305, an NVRAM 306, and a cache memory 307, which are connected to one another by an internal bus 308. Moreover, the SAN switch 300 is connected to the host computer 100 and the storage device 500 through the switch port 301. The SAN switch 300 may also include a LAN interface 303, in which case the SAN switch is connected to the LAN switch 400 through the LAN interface 303.

The SAN switch 300 relays a frame received from the host computer 100 and a frame received from the storage device 500. Here, the frame is a single unit of information being communicated. Information relayed by the SAN switch 300 includes an SCSI command (including an I/O command) and a message. Each physical port such as the physical port 105 on the host computer 100 and a physical port 502 (to be described) on the storage device 500 has a WWN (World Wide Name) to identify the port and a SAN address used to perform communication in a SAN. When the Fiber Channel is used in particular, the SAN address is called a Port_ID where the frame includes both a Port_ID of a source port (source Port_ID) and a Port_ID of a destination port (destination Port_ID). The SAN switch 300 relays the received frame on the basis of the destination Port_ID.

Figure 3:
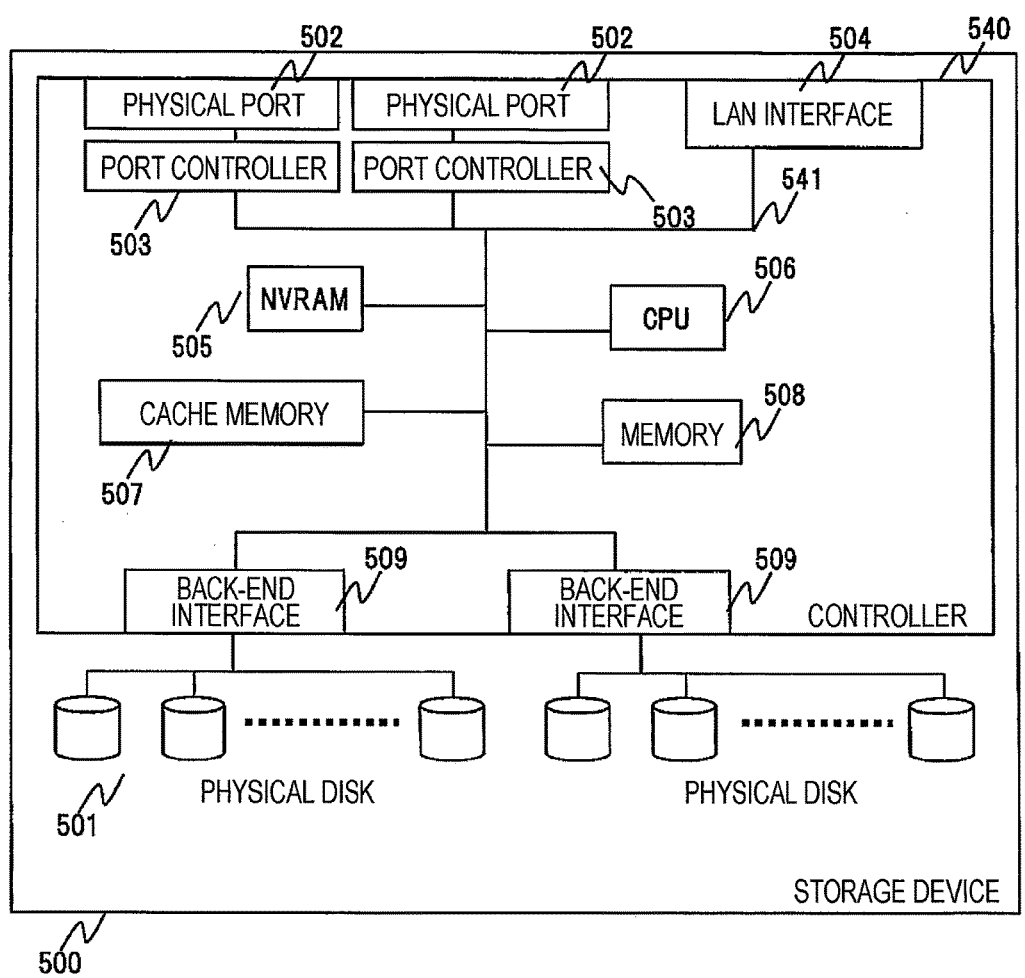
FIG. 3 is a diagram illustrating an example of a hardware system configuration of a storage device according to the first embodiment of the present invention.

FIG. 3 illustrates an internal configuration of the storage device 500. The storage device 500 includes a controller 510 and a physical disk 501. A controller 540 includes a CPU 506, a memory 508, an NVRAM 505, a cache memory 507, a back-end interface 509, a LAN interface 504, the physical port 502, and a port controller 503, which are connected to one another by an internal bus 541. The controller 540 is connected to the physical disk 501 through the back-end interface 509. The storage device 500 is connected to the management server 200 through the LAN interface 504. Moreover, the storage device 500 is connected to the host computer 100 through the physical port 502. The physical disk 501 may be formed of a plurality of types of disks such as a SAS (Serial Attached SCSI (Small Computer System Interface)) disk, a SATA (Serial Advanced Technology Attachment) disk, and an SSD (Solid State Drive).

Figure 4:
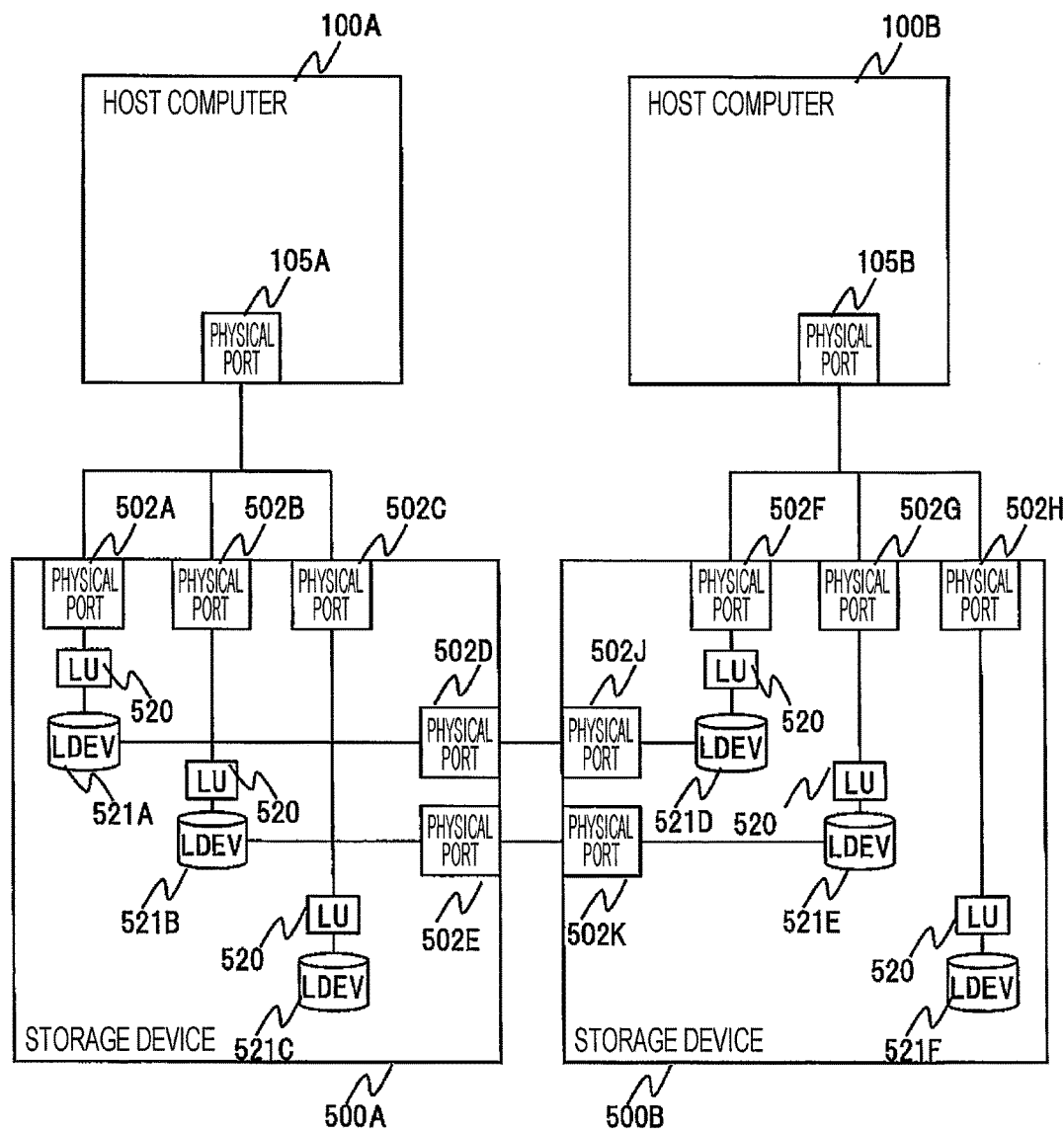
FIG. 4 is a diagram illustrating an example of a logical configuration of the IT system according to the first embodiment of the present invention.

FIG. 4 is a diagram illustrating a configuration of a logical connection between the host computer 100 and the storage device 500. Note that in FIG. 4, a plurality of the same type of components is distinguished by assigning thereto an alphabetic character at the end of a reference numeral (such as a host computer 100A and a host computer 100B). That is, the host computer 100 is a general term including the host computer 100A and the host computer 100B. Moreover, FIG. 4 illustrates a logical connection relationship where, physically, the physical ports 105 and 502 are connected to each other through the SAN switch 300. As a result, communication can be established between any of the physical ports according to the setting of the host computer 100 and the storage device 500.

The storage device 500 includes the physical port 502, an LU (Logical Unit) 520, and an LDEV (Logical Device) 521. The LU 520 is a logical storage area specified along with the destination Port_ID of the physical port when the host computer 100 transmits a frame. The LDEV 521 is a logical storage area recognized by the storage device 500 and is associated with the physical port 502 through the LU 520. A path provided from the physical port 105 of the host computer 100 to the physical port 502, the LU 520, and the LDEV 521 of the storage device 500 is hereinafter referred to as a path between host and storage device. The path between host and storage device is provided for each LU 520.

A path between the storage devices is formed in a manner similar to the path between host and storage device. A path provided from the physical port 502 of one of the storage devices 500 to the physical port 502, the LU 520, and the LDEV 521 of another one of the storage devices 500 is hereinafter referred to as a path between, storage devices. Note that the LDEV 521 and the physical port 502 can be directly associated with each other by omitting the LU 520 when a unique protocol is used between the storage devices to establish communication. There is a path, for example, that is used in a remote copy function which prevents data loss at the time of an accident by copying data of an LDEV 521A in a storage device 500A to an LDEV 521D in a storage device 500B. In this function, the storage device. 500A specifies not the LU 520 but a Port_ID of a destination physical port 502J and an identifier of the LDEV 521D (LDEV ID) of the storage device 500B when transmitting a frame to the storage device 500B.

Figure 5:
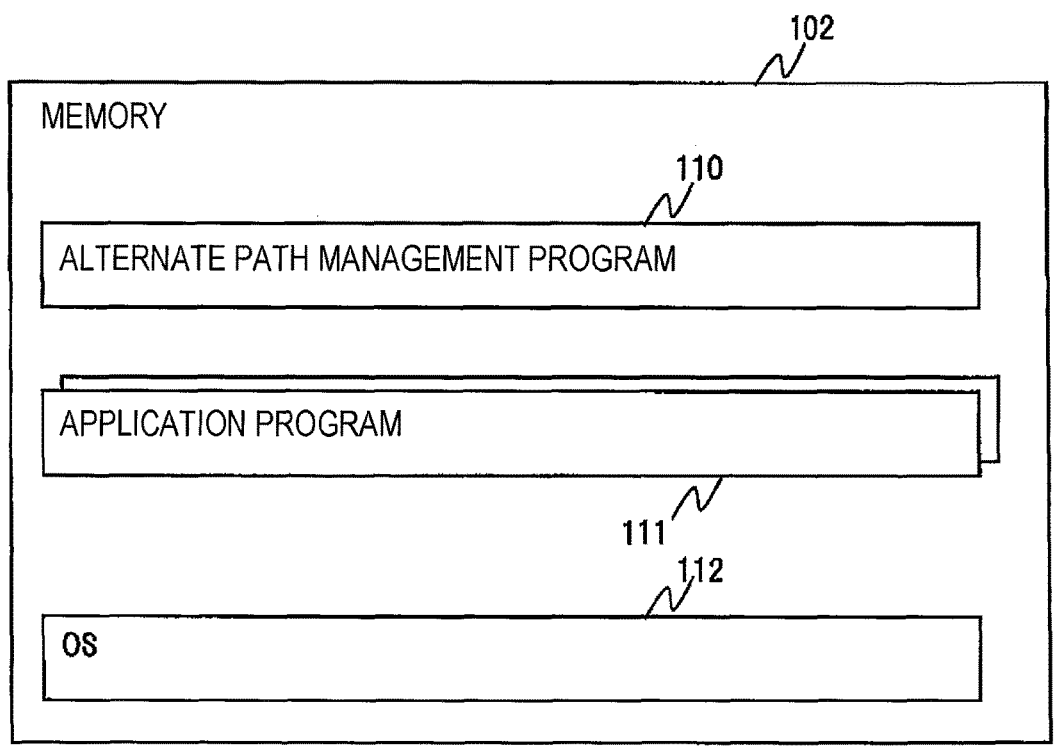
FIG. 5 is a diagram illustrating an example of a configuration of a memory on the host computer according to the first embodiment of the present invention.

FIG. 5 illustrates a configuration of the memory 102 on the host computer 100. The memory 102 stores an alternate path management program 110, one or more application programs 111, and an OS (Operating System) 112. The alternate path management program 110 is a computer program used to manage setting of the path between host and storage device on the host computer 100. The alternate path management program 110 changes/deletes the setting of the path between host and storage device on the host computer 100 side and transmits/receives an I/O command to the LU 520. Moreover, the alternate path management program 110 manages a plurality of the paths between host and storage device set to the LDEV 521 as an alternate path. The alternate path management program 110 can therefore switch the I/O command to a normal path between host and storage device and continue the operation of the application program 111 when a trouble occurs in any of the plurality of paths between host and storage device set to one LDEV 521. The alternate path management program 110 further includes a function of dispersing the load among the plurality of paths between host and storage device by alternately issuing the I/O command to the alternate path. Note that the alternate path management program 110 may be installed in the OS 112.

Figure 6:
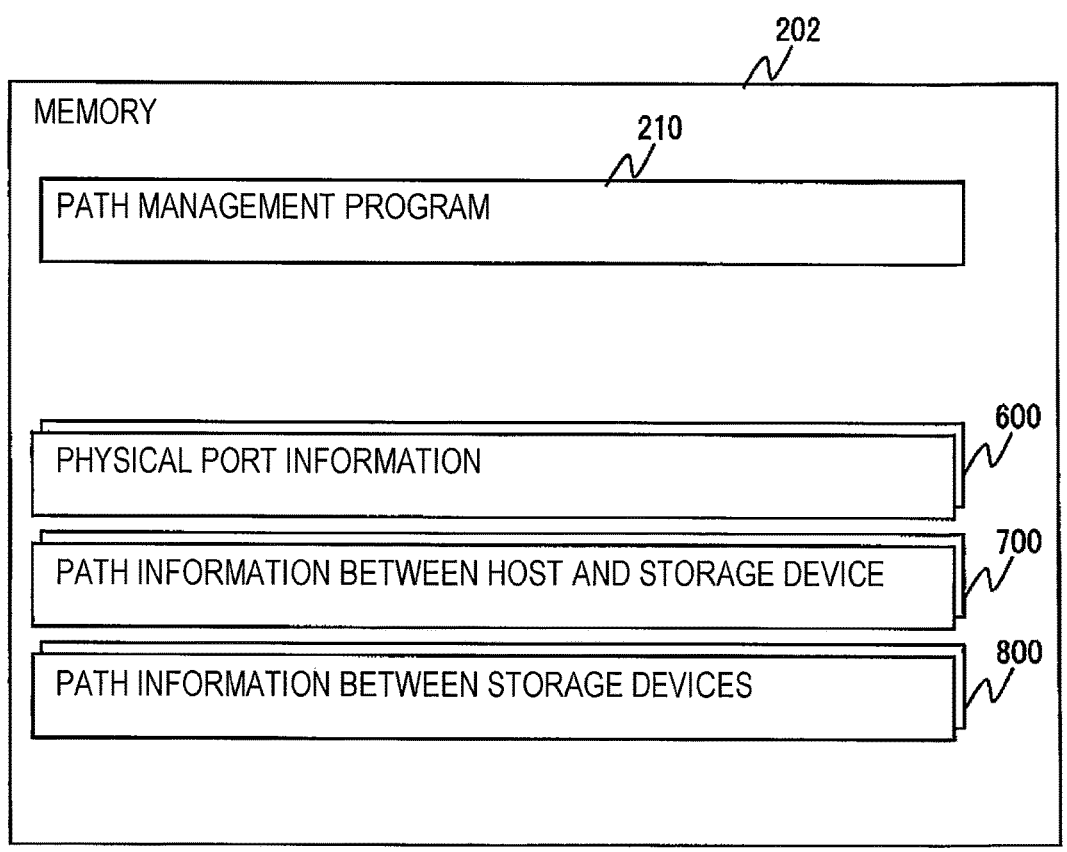
FIG. 6 is a diagram illustrating an example of a configuration of a memory on the management server according to the first embodiment of the present invention.

FIG. 6 illustrates a configuration of the memory 202 on the management server 200. The memory 202 stores a path management program 210, physical port information 600, path information between host and storage device 700, and path information between storage devices 800. The path management program 210 executes main processing of the present embodiment that is to be described in detail with reference to FIGS. 11 to 18. Each of the physical port information 600, the path information between host and storage device 700, and the path information between storage devices 800 is acquired from one or more of the storage devices 500 by the path management program 210 where the number of pieces of information each being held equals the number of the storage devices 500. Note that the path management program 210 may acquire the information from a specific storage which collects information in another storage, or acquire the information individually from storages each. The physical port information 600, the path information between host and storage device 700, and the path information between storage devices 800 will be described in detail later on. Note that the memory 202 may also store another program or information.

Figure 7:
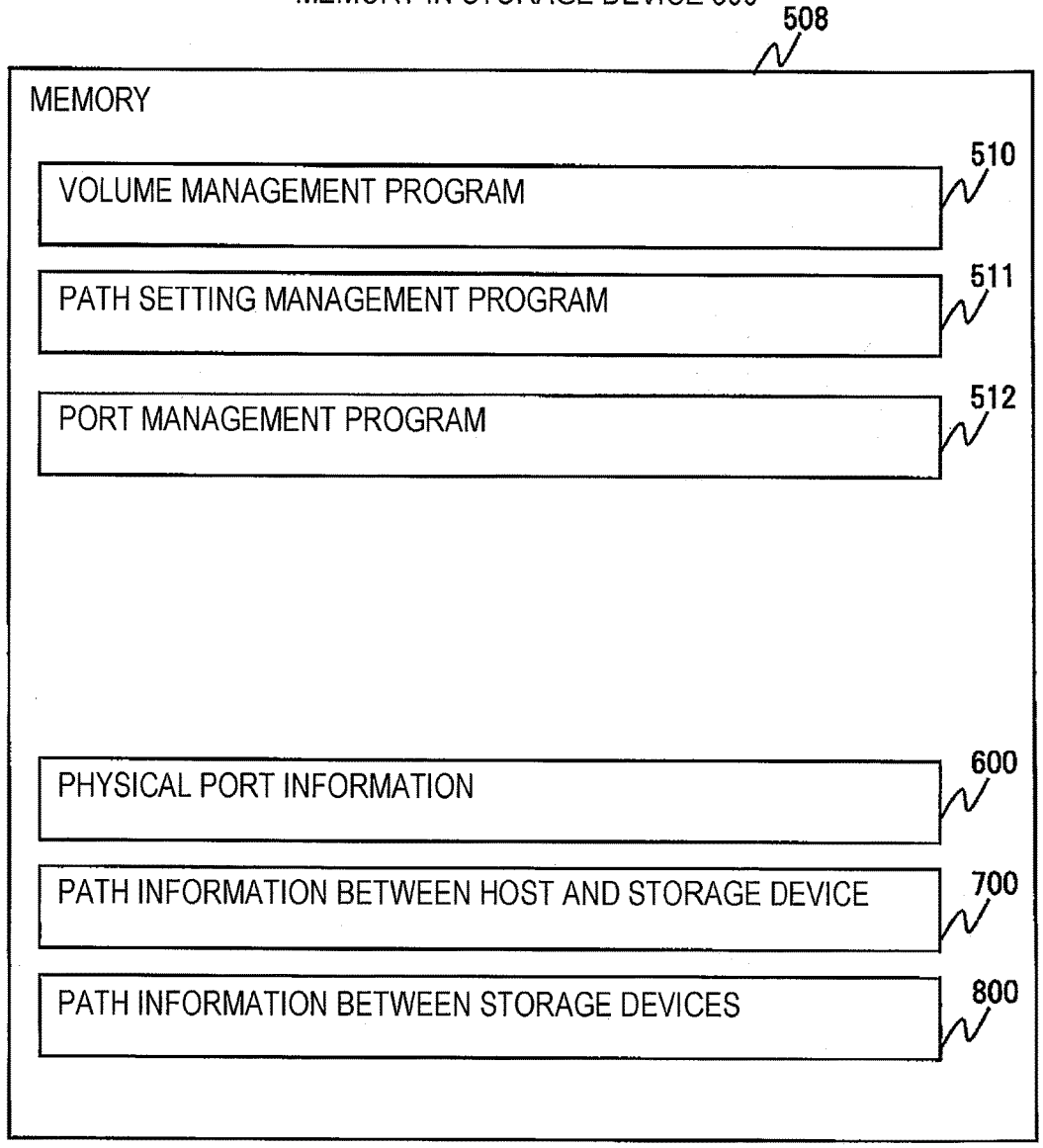
FIG. 7 is a diagram illustrating an example of a configuration of a memory on the storage device according to the first embodiment of the present invention.

FIG. 7 illustrates a configuration of the memory 508 on the storage device 500. The memory 508 stores a volume management program 510, a path setting management program 511, a port management program 512, the physical port information 600, the path information between host and storage device 700, and the path information between storage devices 800. The volume management program 510 operates the plurality of physical disks 501 by a RAID (Redundant Arrays of Independent Disks) method, for example, to group a physical storage area included in each physical disk 501 and form one or more of the LDEVs 521. Moreover, the volume management program 510 assigns an LDEV ID, which is a unique identifier in the storage, to each LDEV 521 and manages the ID. The port management program 512 assigns a physical port number, which is a unique identifier in the storage, to the physical port 502 and manages the physical port information 600. The path setting management program 511 manages the path information between host and storage device 700 and the path information between storage devices 800.

FIG. 8 is a diagram illustrating an example of the physical port information 600. The physical port information 600 is formed of a physical port number column 601, a physical port WWN column 602, an attribute column 603, a current load column 604, an allowable load column 605, and a use status column 606 but may include other information. The identifier of the physical port 502 is registered under the physical port number column 601. Note that the identifier registered under the physical port number column 601 is the identifier on the storage device 500 and is different from the Port_ID being the identifier on the SAN.

The WWN of the physical port 502 is registered under the physical port WWN column 602. The WWN of the physical port is a fixed value calculated from a serial number of the storage device 500 and the physical port number, for example.

The Port_ID being the identifier of the physical port 502 on the SAN is registered under a Port_ID column 607. The Port_ID is assigned for each WWN by transmitting a login request to the SAN, switch 300. Note that the correspondence between the WWN and the Port_ID is held not only on the SAN switch 300 but on the storage device 500 and the host computer 100 to be used in transmitting/receiving a frame.

An attribute indicating the use of the physical port 502 is registered under the attribute column 603. The attribute includes "Target" which receives an SCSI command from the host computer 100 or another storage device 500, "External" which issues the SCSI command to the other storage device 500, "Initiator" which issues the unique command of the remote copy function to the other storage device 500, and "RCU Target" which receives the unique command of the remote copy function from the other storage device 500, for example.

The load of the physical port 502 is registered under the current load column 604. The load is the data transfer amount per unit time that is measured regularly, for example, but may be another index such as the number of I/Os per unit time. The maximum load allowed in the physical port 502 is registered under the allowable load column 605. What is registered under the use status column 606 is whether the physical port 502 is in use or not in use. The "in use" status indicates that the LU 520 or the LDEV 521 is associated with the physical port 502. The "not in use" status indicates a state other than the "in use" status.

FIG. 9 is a diagram illustrating an example of the path information between host and storage device 700. The path information between host and storage device 700 is formed of an LDEV ID column 701, a physical port number column 702, an LUN column 703, a host port WWN column 704, and a current load column 705 but may include other information. The identifier of the LDEV 521 in the storage device 500 is registered under the LDEV ID column 701. A physical port number of a port and a LUN, a path of each of which is set to the LDEV 521, are registered under the physical port number column 702 and the LUN column 703, respectively. Note that the LUN is a number uniquely specifying the LU 520 of each physical port 502, where there may be a duplicate number between different physical ports 502. Registered under the host port WWN column 704 is a WWN of the physical port 105 of the host computer 100 forming the path between host and storage device while recognizing the physical port 502 and the LU 520. The load of each path is registered under the current load column 705. Here, the load of the path corresponds to an IO frequency with respect to the LU or the LDEV associated with the port. Note that the sum of the values under the current load column 705 for all the paths between host and storage device set to the same physical port 502 corresponds with the values under the current load column 604 of the physical port information 600.

FIGS. 10(*a*) to 10(*c*) are diagrams illustrating an example of the path information between storage devices 800. The path information between storage devices 800 is a general term for data migration path (on the side of the storage being a migration destination) information 810 illustrated in FIG. 10(*a*), data migration path (on the side of the storage being a migration source) information 820 illustrated in FIG. 10(*b*), and remote copy path information 830 illustrated in FIG. 10(*c*), for example.

FIG. 10(*a*) is a diagram illustrating an example of the data migration path (on the side of the storage being the migration destination) information 810. The data migration path is a path between storage devices provided to move a piece of data in the LDEV 521 of one of the storage devices 500 to the LDEV 521 of another one of the storage devices 500. The data migration path (on the side of the storage being the migration destination) information 810 is formed of own storage information 801A which is a piece of information of a path inside one of the storage devices 500, and external storage information 802A which is a piece of information of another one of the storage devices 500 connected to the one storage device 500. The own storage information 801A includes an LDEV ID column 811, a physical port number column 812, and a current load column 813. The external storage information 802A includes a port WWN column 814 and an LUN column 815. The own storage information 801A and the external storage information 802A may both include information besides what is described above. The identifier of the LDEV 521 in the storage device 500 is registered under the LDEV ID column 811. A physical port number of a port, a path of which is set to the LDEV 521, is registered under the physical port number column 812. The load of each path is registered under the current load column 813. Note that the sum of the values under the current load column for all the paths between host and storage device set to the same physical port 502 corresponds with the values under the current load column 604 of the physical port information 600. The WWN of the physical port 502 is registered under the port WWN column 814. The LUN of the LU 520 is registered under the LUN column 815.

FIG. 10(*b*) is a diagram illustrating an example of the data migration path (on the side of the storage being the migration source) information 820. The data migration path (on the side of the storage being the migration source) information 820 is formed of own storage information 801B which is a piece of information of a path inside one of the storage devices 500, and external storage information 802B which is a piece of information of another one of the storage devices 500 connected to the one storage device 500. The own storage information 801B includes an LDEV ID column 821, a physical port number column 822, an LUN column 823, and a current load column 824. The external storage information 802B includes a port WWN column 825. The own storage information 801B and the external storage information 802B may both include information besides what is described above. The identifier of the LDEV 521 in the storage device 500 being the migration source is registered under the LDEV ID column 821. A physical port number of a port and an LUN, a path of each of which is set to the LDEV 521, are registered under the physical port number column 822 and the LUN column 823, respectively. The load of each path is registered under the current load column 824. Note that the sum of the values under the current load column for all the paths between storage devices set to the same physical port 502 corresponds with the values under the current load column 604 of the physical port information 600. The WWN of the physical port 502 is registered under the port WWN column 825.

FIG. 10(*c*) is a diagram illustrating an example of the remote copy path information 830. A remote copy path is a path between storage devices provided to copy and synchronize data in the LDEV 521 between two or more of the storage devices 500. The remote copy path information 830 is formed of own storage information 801C which is a piece of information of a path inside one of the storage devices 500, and external storage information 802C which is a piece of information of another one of the storage devices 500 connected to the one storage device 500. The own storage information 801C includes an LDEV ID column 831, a physical port number column 832, and a current load column 833. The external storage information column 802C includes a port WWN column 834 and an LDEV ID column 835. The own storage information 801C and the external storage information 802C may both include information besides what is described above. What is largely different from the data migration path (on the side of the storage being the migration destination) information 810 is the LDEV ID column 835 that is provided in place of the LUN column 815. The identifier of the LDEV 521 in the storage device 500 is registered under the LDEV ID column 835.

Figure 11:
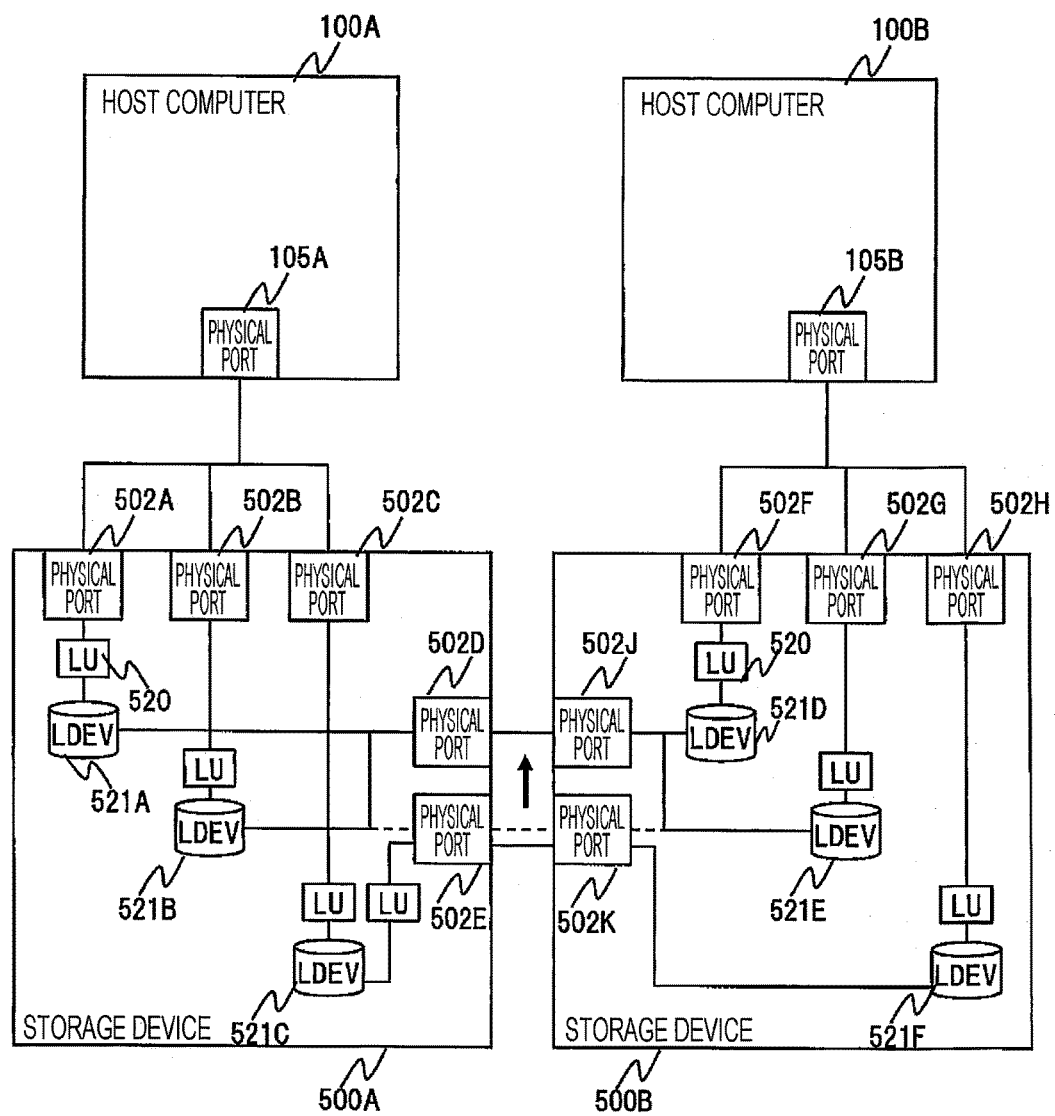
FIG. 11 is a schematic diagram illustrating an example of path accommodation processing between storage devices as well as path setting processing according to the first embodiment of the present invention.

FIG. 11 is a schematic diagram illustrating an example of the path accommodation processing between storage devices as well as the path setting processing according to the present embodiment. The path accommodation processing between storage devices is processing which changes the setting of the existing path between storage devices and secures a physical port to form a new path when setting a new path between storage devices or path between host and storage device. The path setting processing is processing which uses the physical port secured in the path accommodation processing between storage devices and sets a new path. Note that each of the path accommodation processing between storage devices and the path setting processing is executed during the band accommodation processing to be described with reference to FIG. 13 and the like later on.

FIG. 11 illustrates a case where a new path between storage devices (data migration path) is set to migrate data in the LDEV 521C to the LDEV 521F, for example. Specifically, the path management program 210 gives an instruction to the storage devices 500A and 500B and sets a new path through the physical ports 502D and 502J to the LDEVs 521B and 521E that are already connected through a remote copy path. The path management program 210 further cancels the existing path between storage devices which connects the LDEVs 521B and 521E through the physical ports 502E and 502K. As a result, the physical ports 502E and 502K are secured as free physical ports available for the data migration path. The path management program 210 gives an instruction to the storage devices 500A and 500B and connects the LDEV 521C and the LDEV 521F by the data migration path through the physical ports 502E and 502K and the LU 520 under the physical port 502E. Note that while the path accommodation processing between storage devices and the path setting processing have been described to employ a method in which the path management program 210 on the management server 200 gives the instruction to the storage device 500, the processing may also employ a method in which one of the plurality of storage devices 500 gives an instruction to another one of the storage devices 500.

Figure 12:
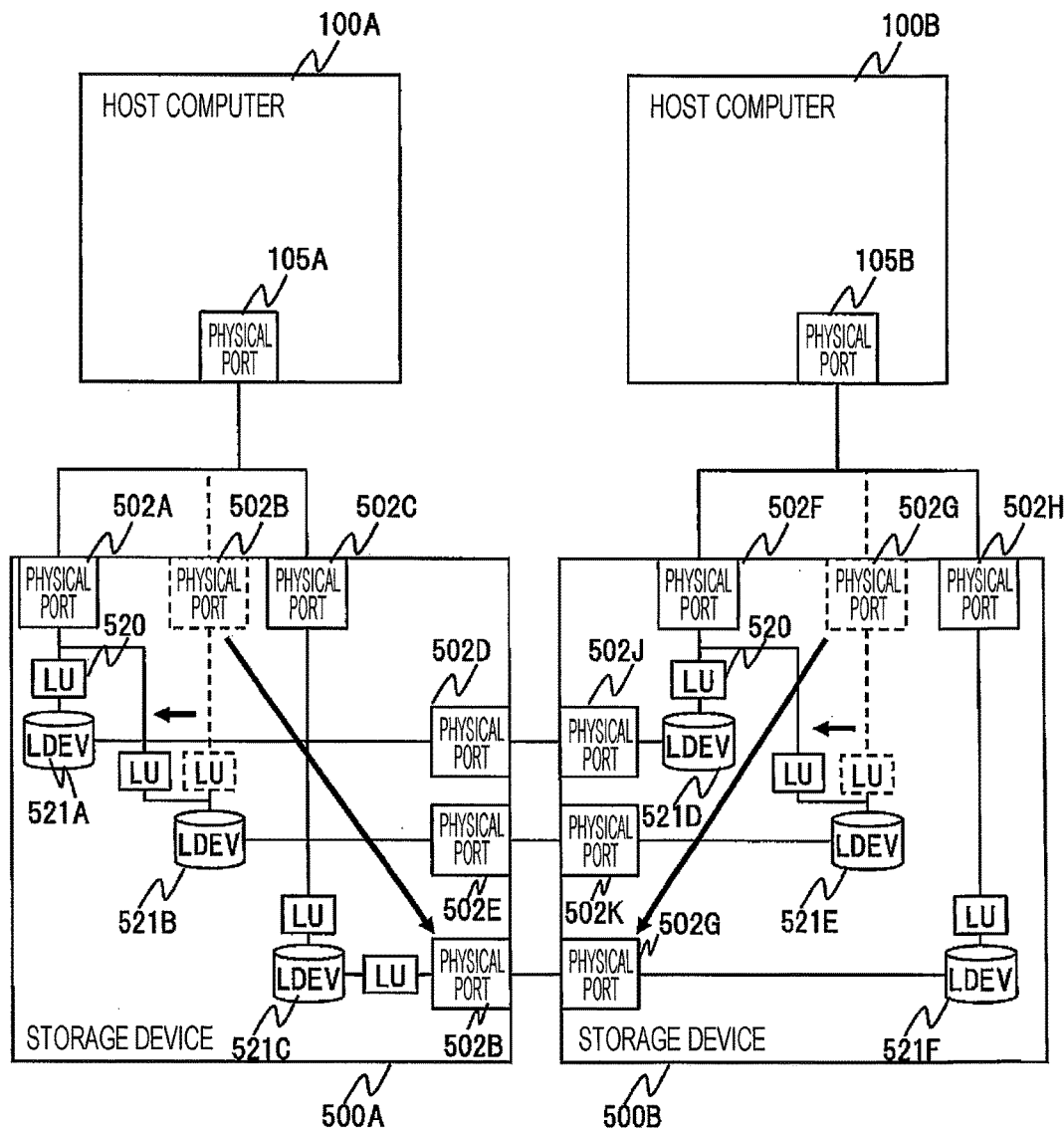
FIG. 12 is a schematic diagram illustrating an example of path accommodation processing between host and storage device as well as path setting processing according to the first embodiment of the present invention.

FIG. 12 is a schematic diagram illustrating an example of the path accommodation processing between host and storage device as well as the path setting processing according to the present embodiment. The path accommodation processing between host and storage device as well as the path setting processing change the setting of an existing path between host and storage device and are thus different from the path accommodation processing between storage devices and the path setting processing which change the setting of the existing path between storage devices.

FIG. 12 illustrates a case where the setting of the existing path between host and storage device is changed to secure a new physical port for the data migration path in order to set a new path between storage devices (data migration path) used to migrate data in the LDEV 521C to the LDEV 521F, for example. Specifically, the path management program 210 on the management server 200 gives an instruction to the storage device 500A and sets a new path through the LU 520 which associates the physical port 502A and the LDEV 521B to the LDEV 521B to which the path between host and storage device is already set. The path management program 210 further cancels the existing path between host and storage device which connects the LDEV 521B through the physical port 502B. Likewise, the path management program 210 sets a new path through the LU 520 which associates the physical port 502F and the LDEV 521E. The path management program 210 further cancels the existing path between host and storage device which connects the LDEV 521E through the physical port 502G. Note that the cancellation of the path between host and storage device requires not only the change of setting of the storage device 500 but also a path cancellation instruction given to the alternate path management program 110 of the host computer 100. The path cancellation instruction may be an instruction given by a TCP/IP via a LAN or an SCSI command given via a SAN. As a result, the physical ports 502B and 502G are secured as free physical ports available for the data migration path. The path management program 210 gives an instruction to the storage devices 500A and 500B and connects the LDEV 521C and the LDEV 521F by the data migration path through the physical ports 502B and 502G and the LU 520 under the physical port 502B. Note that while these processings have been described to employ a method in which the path management program 210 on the management server 200 gives the instruction to the storage device 500, the processings may also employ a method in which one of the plurality of storage devices 500 gives an instruction to another one of the storage devices 500.

Figure 13:
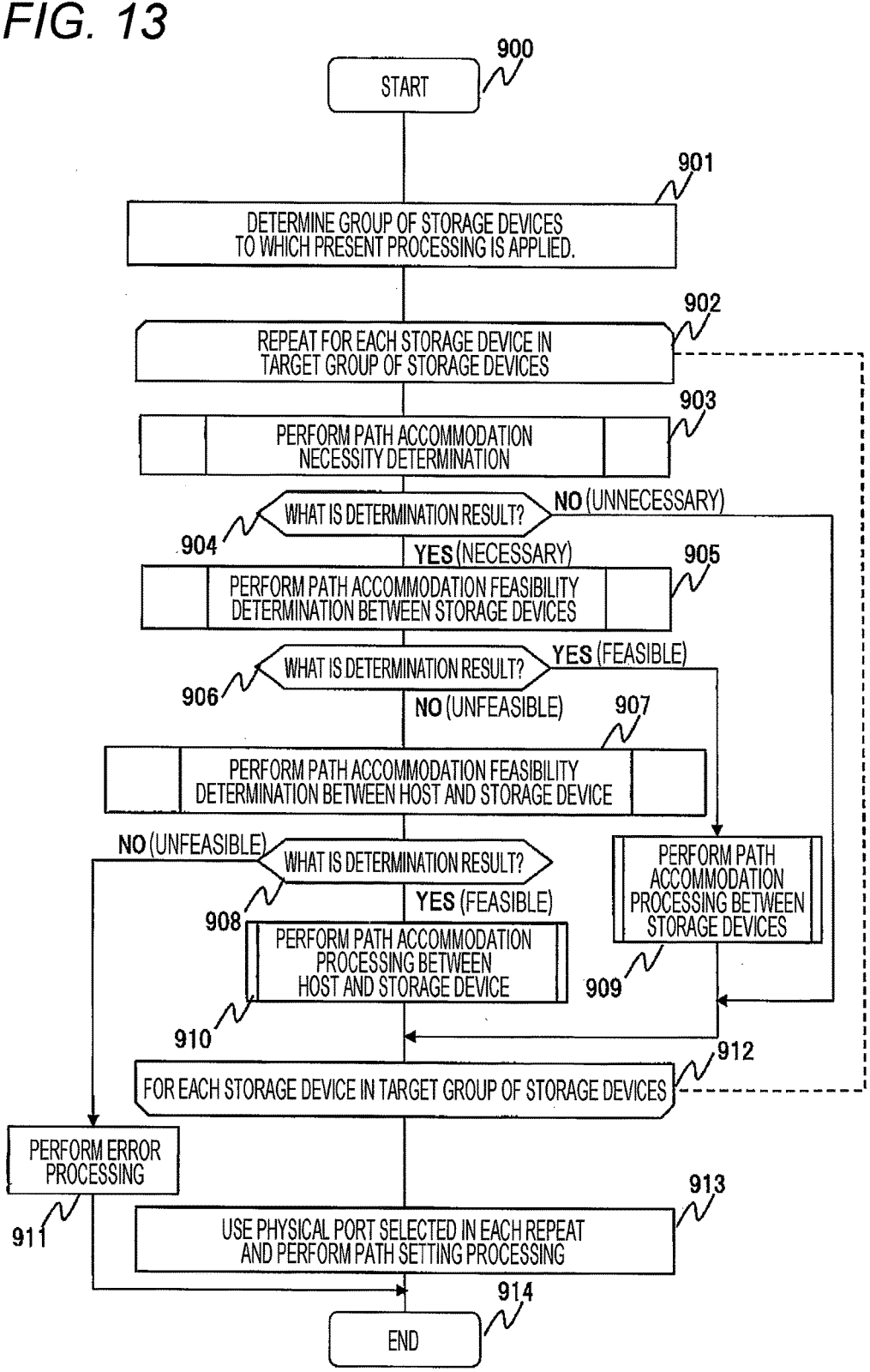
FIG. 13 is a flowchart illustrating an example of band accommodation processing according to the first embodiment of the present invention.

FIG. 13 is an example of a flowchart illustrating the band accommodation processing according to the present embodiment. The band accommodation processing is started (step 900) when a user uses the management server 200 to set a new path between storage devices or a new path between host and storage device. Note that while the details will be described later, the processing is triggered not only when the path between storage devices or path between host and storage device is set but also when the data migration is completed or the load is changed. Each step taken in the band accommodation processing will be described below. Step 901: the path management program 210 determines one or more of the storage devices 500 to which the band accommodation processing is applied. When the user newly sets a path between storage devices, two of the storage devices connected by the path between storage devices are the target of the processing. When the user newly sets a path between host and storage device, the storage device 500 connected to the host computer 100 by the path between host and storage device is the target of the processing.

Step 902: the path management program 210 selects, from the one or more of the storage devices 500 to be processed determined in step 901, one of the storage devices 500 on which processing in step 903 onward is not performed. Processing performed in each of steps 903 to 910 pertains to a path of the selected storage device 500 unless otherwise specified.

Step 903: the path management program 210 performs path accommodation necessity determination. The path accommodation necessity determination is processing which determines whether or not it is required to change (accommodate) the setting of an existing path on the basis of the setting status of the existing path between host and storage device or between storage devices and a load status. Details will be described later with reference to FIG. 14 and the like. Step 904: the path management program 210 proceeds to step 912 when a determination result of step 903 is NO (unnecessary). On the other hand, the path management program 210 proceeds to step 905 when the determination result of step 903 is YES (necessary).

Step 905: the path management program 210 performs path accommodation feasibility determination between storage devices. The path accommodation feasibility determination between storage devices is processing which determines whether or not there is a path that can be integrated in the path accommodation processing between storage devices (step 909) to be described later on the basis of the setting status of the existing path between storage devices and the load status. Details will be described later with reference to FIG. 15 and the like. Note that when it is determined "feasible", there is selected a pair of physical ports to be subjected to the path accommodation processing between storage devices in step 909.

The integration includes processing in which the number of physical ports 502 used decreases after the processing such as when two of the physical ports 502 are reset to one of the physical ports 502 or when three of the physical ports 502 are reset to two of the physical ports 502. While there will be described only the case where the two physical ports 502 are integrated to the one physical port 502 in order to simplify the description, there may be combined the method in which the three physical ports 502 are integrated to the two physical ports 502.

Step 906: the path management program 210 proceeds to step 909 when a determination result of step 905 is YES (feasible). On the other hand, the path management program 210 proceeds to step 907 when the determination result of step 905 is NO (unfeasible).

Step 909: the path management program 210 gives an instruction to the storage device 500, integrates the path between storage devices set to each of the two physical ports 502 selected in step 905, and selects the physical port 502 that is not in use (free physical port). Step 907: the path management program 210 performs path accommodation feasibility determination between host and storage device. The path accommodation feasibility determination between host and storage device is processing which determines whether or not there is a path that can be integrated in the path accommodation processing between host and storage device (step 910) to be described later on the basis of the setting status of the existing path between host and storage device and the load status.

Note that when it is determined "feasible", there is selected a pair of physical ports to be subjected to the path accommodation processing between host and storage device in step 910.

Similar to the integration of the path between storage devices, the integration includes processing in which the number of physical ports 502 used decreases after the processing such as when two of the physical ports 502 are reset to one of the physical ports 502 or when three of the physical ports 502 are reset to two of the physical ports 502. While there will be described only the case where the two physical ports 502 are integrated to the one physical port 502 in order to simplify the description, there may be combined the method in which the three physical ports 502 are integrated to the two physical ports 502.

Step 908: the path management program 210 proceeds to step 910 when a determination result of step 907 is YES (feasible). On the other hand, the path management program 210 proceeds to step 911 when the determination result of step 907 is NO (unfeasible).

Step 910: the path management program 210 gives an instruction to the storage device 500, integrates the path between host and storage device set to each of the two physical ports 502 selected in step 907, and selects the physical port 502 that is not in use (free physical port).

Step 911: the path management program 210 performs error processing and ends the processing (step 914). The error processing presents an error message to the effect that "a new path between storage devices could not be set due to lack of a required band" to a user through an output device connected to the management server 200, for example. The error processing in this example may also present a serial number of the storage device 500 that is in short of the required band such that the user can specify the storage device 500 in which the error has occurred.

Step 912: the path management program 210 proceeds to step 913 when having processed all the storage devices 500 selected in step 901. On the other hand, the path management program 210 proceeds to step 902 (repeat processing) when any of the storage devices 500 selected in step 901 has not yet been processed.

Step 913: the path management program 210 uses the physical port 502 (free physical port) selected in each repeat processing to set a new path between host and storage device or between storage devices and then ends the processing (step 914).

Note that according to the flowchart above, the execution of the path accommodation processing between storage devices is given priority over the path accommodation processing between host and storage device. The processing can also be performed when this order is reversed. In the present embodiment, the execution of the path accommodation processing between storage devices is given priority over the path accommodation processing between host and storage device. This is because the path accommodation processing between storage devices can be executed without changing the setting of the host computer 100 running the business-use application program 111 and has less effect on business operations compared to the path accommodation processing between host and storage device.

Figure 14:
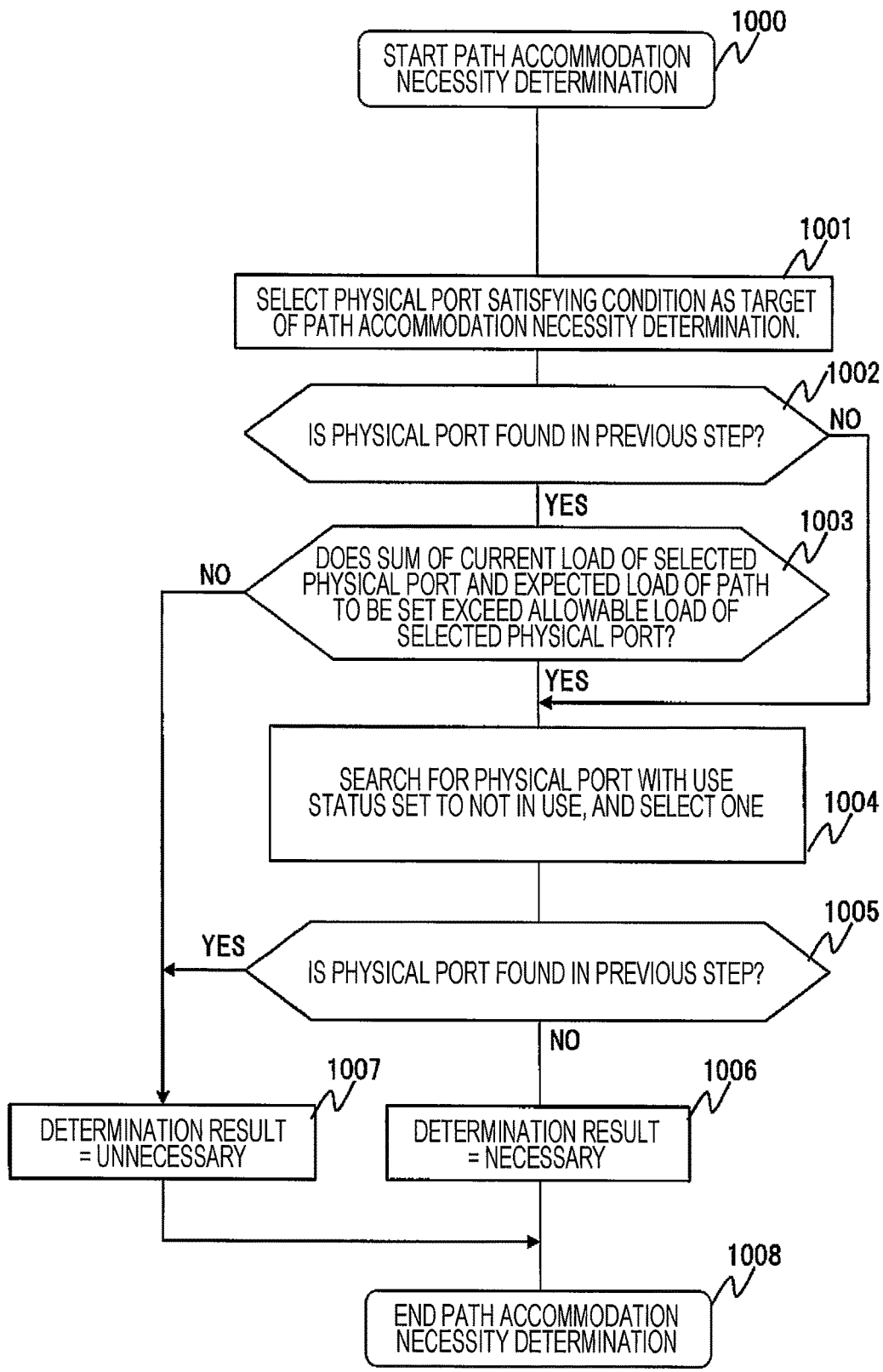
FIG. 14 is a flowchart illustrating an example of path accommodation necessity determination processing of the band accommodation processing according to the first embodiment of the present invention.

FIG. 14 is an example of a flowchart illustrating the detail of the path accommodation necessity determination. The path accommodation necessity determination is started by step 903 (step 1000). Note that this determination processing is executed on the basis of the physical port information 600, the path information between host and storage 700, and the path information between storage devices 800 of the storage device 500 that is selected in step 902, unless otherwise specified. Each step performed in the path accommodation necessity determination will be described below.

Step 1001: the path management program 210 selects a physical port that satisfies the condition to be a target of the path accommodation necessity determination. The path management program 210 refers to the path information between host and storage device 700 as well as the path information between storage devices to extract the physical port used for the existing path between storage devices when a path between storage devices is to be set, or extract the physical port used for the existing path between host and storage device when a path between host and storage device is to be set. The physical port information 600 of the extracted physical port is referenced to search for the one having the attribute that matches the attribute used for the path to be set. When there is found a plurality of the physical ports 520 having the attribute that matches the attribute of the path to be set as a result of the search, the one with the lowest current load 604 is selected.

Step 1002: the path management program 210 proceeds to step 1003 when the physical port 502 is found in step 1001. On the other hand, the path management program 210 proceeds to step 1004 when the physical port 502 is not found in step 1001.

Step 1003: the path management program 210 determines whether or not the sum of the current load of the physical port 502 selected in step 1001 and an expected load of a path to be set exceeds the allowable load of the physical port 502 being selected, and proceeds to step 1004 when the sum exceeds the allowable load or proceeds to step 1007 when the sum does not exceed the allowable load. Specifically, the expected load of the path to be set is added to the current load 604 of the selected physical port while referencing to the physical port information 600, and it is determined whether or not the sum exceeds the allowable load 605. Note that the expected load of the path to be set is an expected value of the load on the path when the path is newly set. The expected value may be input when the user sets the path or may be determined by the current load of the existing path. When the path to be set is the remote copy path, for example, a piece of data written in the LDEV 521, to which the path is to be set, is transferred to another one of the LDEVs 521, which is a pair of the copy, through the path after the remote copy path is set. Therefore, the expected load is the load caused by a Write command among the current load of the LDEV 521 to which the path is to be set. When the prediction is made in this manner, however, the value under the current load column 705 of the path information between host and storage device 700 is recorded separately for the load caused by the Write command and a load caused by a Read command.

Step 1004: the path management program 210 refers to the physical port information 600 and searches for a free physical port (the physical port 502 with the use status 606 corresponding to "not in use"). One of the physical ports 502, when found as a result of the search, is selected.

Step 1005: the path management program 210 proceeds to step 1007 when the physical port 502 is found in step 1004 or proceeds to step 1006 when the physical port is not found.

Step 1006: the path management program 210 outputs "necessary" as the determination result and ends the path accommodation necessity determination (step 1008)

Step 1007: the path management program 210 outputs "unnecessary" as the determination result and ends the path accommodation necessity determination (step 1008).

Note that the processing of searching for the available port from the physical port 502 used for the existing path is given priority over the processing of searching for the free physical port according to the flowchart illustrating the aforementioned path accommodation necessity determination, but this order of priority may be reversed or selected by the user.

Figure 15:
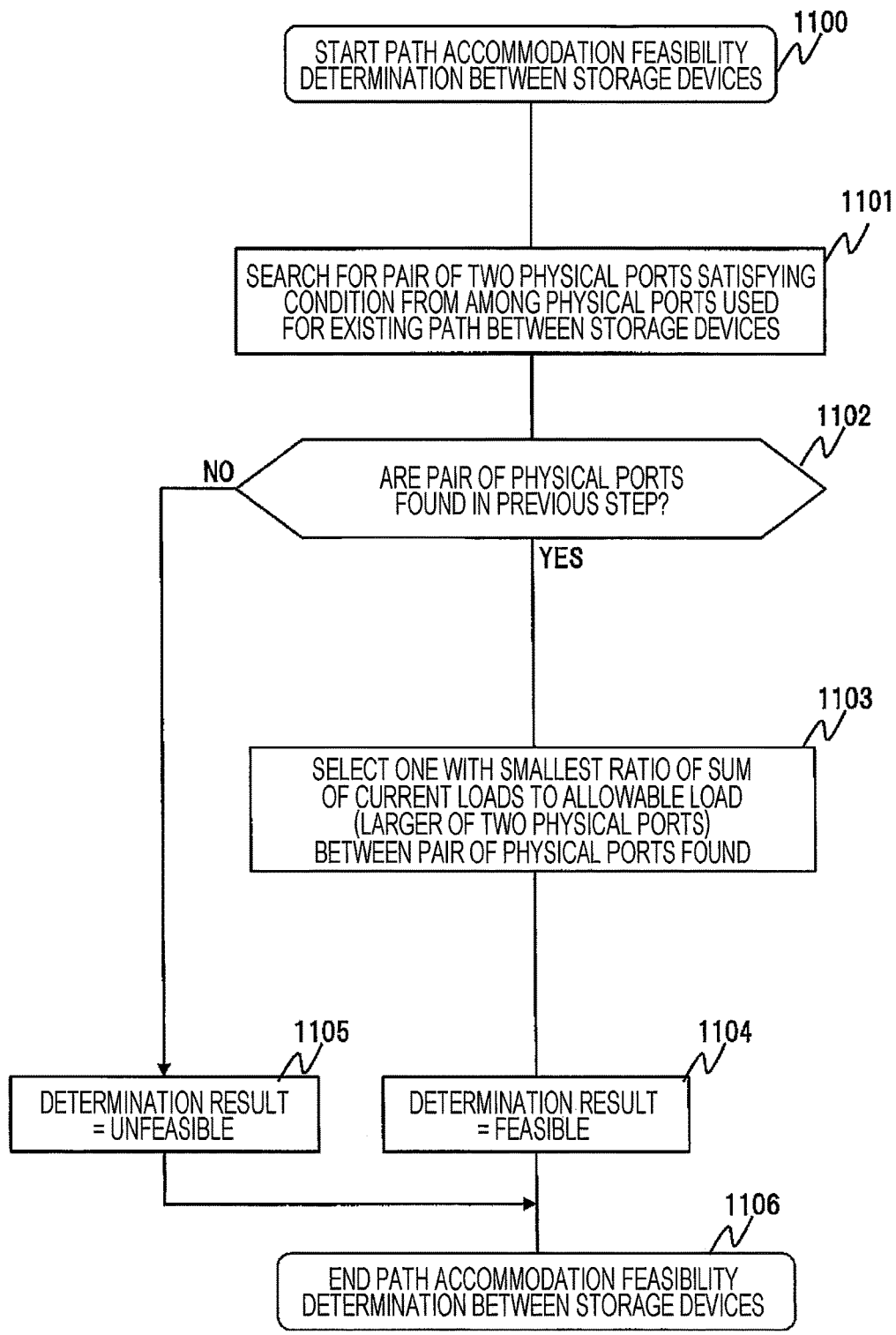
FIG. 15 is a flowchart illustrating an example of path accommodation feasibility determination processing between storage devices of the band accommodation processing according to the first embodiment of the present invention.

FIG. 15 is an example of a flowchart illustrating the detail of the path accommodation feasibility determination between storage devices. The path accommodation feasibility determination between storage devices is started by step 905 (step 1100). Note that this determination processing is executed on the basis of the physical port information 600, the path information between host and storage 700, and the path information between storage devices 800 of the storage device 500 that is selected in step 902, unless otherwise specified. Each step performed in the path accommodation feasibility determination between storage devices will be described below.

Step 1101: the path management program 210 searches for a pair of two of the physical ports 502 satisfying the condition that the physical ports "have the identical attribute" and "the sum of the current loads of the two physical ports 502 is less than the allowable load of at least one of the physical ports", from among the physical ports 502 used for the existing path between storage devices. Specifically, the physical port information 600 is referenced to search for a combination of ports where the sum of the current loads 604 of the physical ports having the identical attribute 603 is equal to or less than the allowable load 605 of any of the ports. Note that an additional condition may be included in the search. There is a case, for example, where the remote copy path is pausing the copy (synchronization) and resumes the copy later. In this case, a correct determination cannot be made solely by the current load, so that the current load may be excluded from the search target or there may be included a condition of using the value of the load before pausing. Processing called copy formation to copy all data in the LDEV 521 is executed when the remote copy path is set, where this processing is executed only once for the remote copy path and is not executed from then on. Therefore, it may be adapted to execute the search processing upon subtracting the load caused by the copy formation, pause the present step when even one of the physical ports 502 of the remote copy path in the middle of performing the copy formation is selected, and then execute the processing from step 1102 onward upon completing the copy formation. The state of the path such as the pause and the copy formation need to be managed when considering the temporary change in the load.

Step 1102: the path management program 210 proceeds to step 1103 when the pair of physical ports are found in step 1101 or proceeds to step 1105 when the pair of physical ports are not found.

Step 1103: the path management program 210 refers to the physical port information 600 and selects, from among the pairs of physical ports 502 found in step 1101, a pair having the smallest ratio of the sum of the current loads of the two physical ports 502 to the larger one of the allowable loads of the two physical ports 502 (the sum of current load/the larger allowable load). Note that this selection may be made according to another criterion or made at random. Moreover, this determination may be made when searching for the combination of ports satisfying the condition in step 1101.

Step 1104: the path management program 210 outputs "feasible" as the determination result and ends the path accommodation feasibility determination between storage devices (step 1106).

Step 1105: the path management program 210 outputs "unfeasible" as the determination result and ends the path accommodation feasibility determination between storage devices (step 1106).

Figure 16:
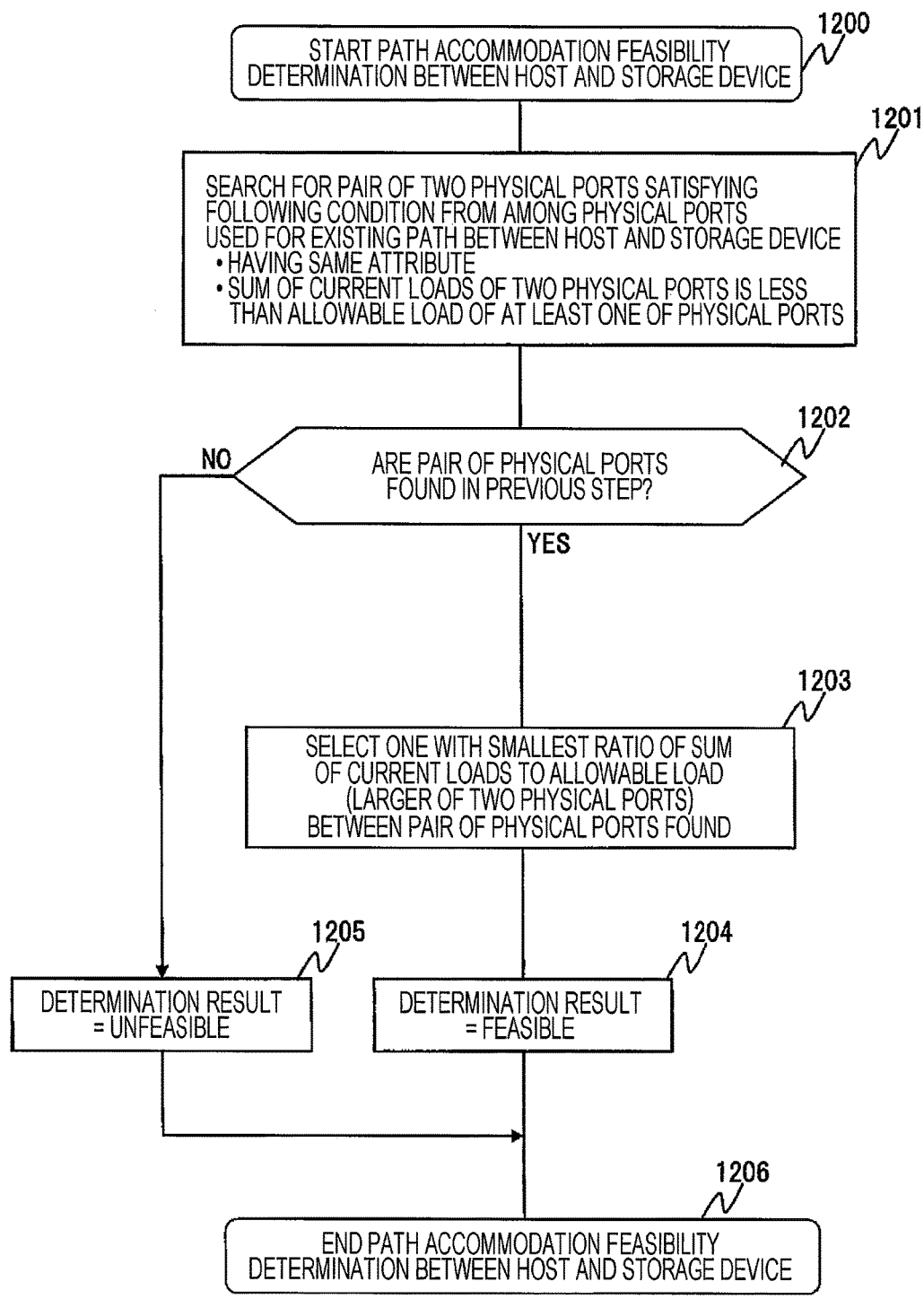
FIG. 16 is a flowchart illustrating an example of path accommodation feasibility determination processing between host and storage device of the band accommodation processing according to the first embodiment of the present invention.

FIG. 16 is an example of a flowchart illustrating the detail of the path accommodation feasibility determination between host and storage device. The path accommodation feasibility determination between host and storage device is started by step 907 (step 1200). Note that this determination processing is executed on the basis of the physical port information 600, the path information between host and storage 700, and the path information between host and storage device 800 of the storage device 500 that is selected in step 902, unless otherwise specified. Each step performed in the path accommodation feasibility determination between host and storage device will be described below.

Step 1201: the path management program 210 searches for a pair of two of the physical ports 502 satisfying the condition that the physical ports "have the identical attribute" and "the sum of the current loads of the two physical ports 502 is less than the allowable load of at least one of the physical ports", from among the physical ports 502 used for the existing path between host and storage device.

Step 1202: the path management program 210 proceeds to step 1203 when the pair of physical ports are found in step 1201 or proceeds to step 1205 when the pair of physical ports are not found.

Step 1203: the path management program 210 selects, from among the pairs of physical ports 502 found in step 1201, a pair having the smallest ratio of the sum of the current loads of the two physical ports 502 to the larger one of the allowable loads of the two physical ports 502 (the sum of current load/the larger allowable load). Note that this selection may be made according to another criterion or made at random.

Step 1204: the path management program 210 outputs "feasible" as the determination result and ends the path accommodation feasibility determination between host and storage device (step 1206).

Step 1205: the path management program 210 outputs "unfeasible" as the determination result and ends the path accommodation feasibility determination between host and storage device (step 1206).

Figure 17:
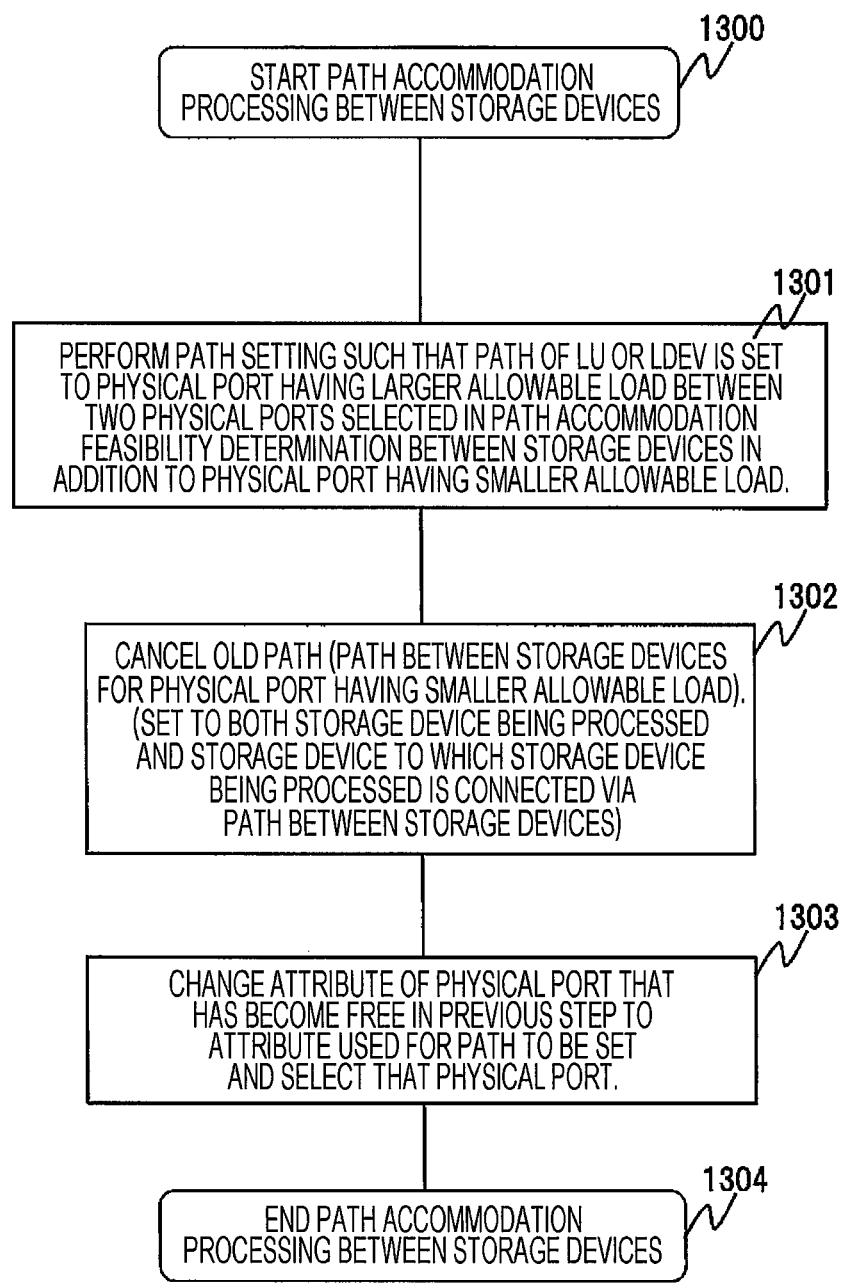
FIG. 17 is a flowchart illustrating an example of the path accommodation processing between storage devices of the band accommodation processing according to the first embodiment of the present invention.

FIG. 17 is an example of a flowchart illustrating the detail of the path accommodation processing between storage devices. The path accommodation processing between storage devices is started by step 909 (step 1300). Each step performed in the path accommodation processing between storage devices will be described below.

Step 1301: the path management program 210 performs path setting such that the path of all the LDEVs 521 is set to the physical port 502 having the larger allowable load between the two physical ports 502 selected in step 1103 in addition to the physical port 502 having the smaller allowable load. Note that this path setting is performed on the storage device 500 (own storage device) selected in step 902 as well as on an external storage device connected by the path to form the path between storage devices. By step 1301, all the LDEVs 521 that are path-set to the physical port 502 having the smaller allowable load are connected to the external storage device through the physical port 502 having the larger allowable load.

Step 1302: the path management program 210 cancels all the paths set to the physical port 502 having the smaller allowable load. Note that this path cancellation includes path setting cancellation on the side of the own storage device and path setting cancellation on the side of the external storage device.

Step 1303: the attribute 603 of the physical port 502 that has become a free physical port in step 1302 is changed to the attribute used by the path to be set so that the physical port is selected and that the path accommodation processing between storage devices ends thereafter (step 1304).

Note that while the LDEV set to the physical port having the smaller allowable load is changed in this case, the LDEV set to the physical port having the larger allowable load may be changed when the allowable load 605 of the physical port having the smaller allowable load exceeds the sum of the current loads 604 of the two physical ports 502.

Figure 18:
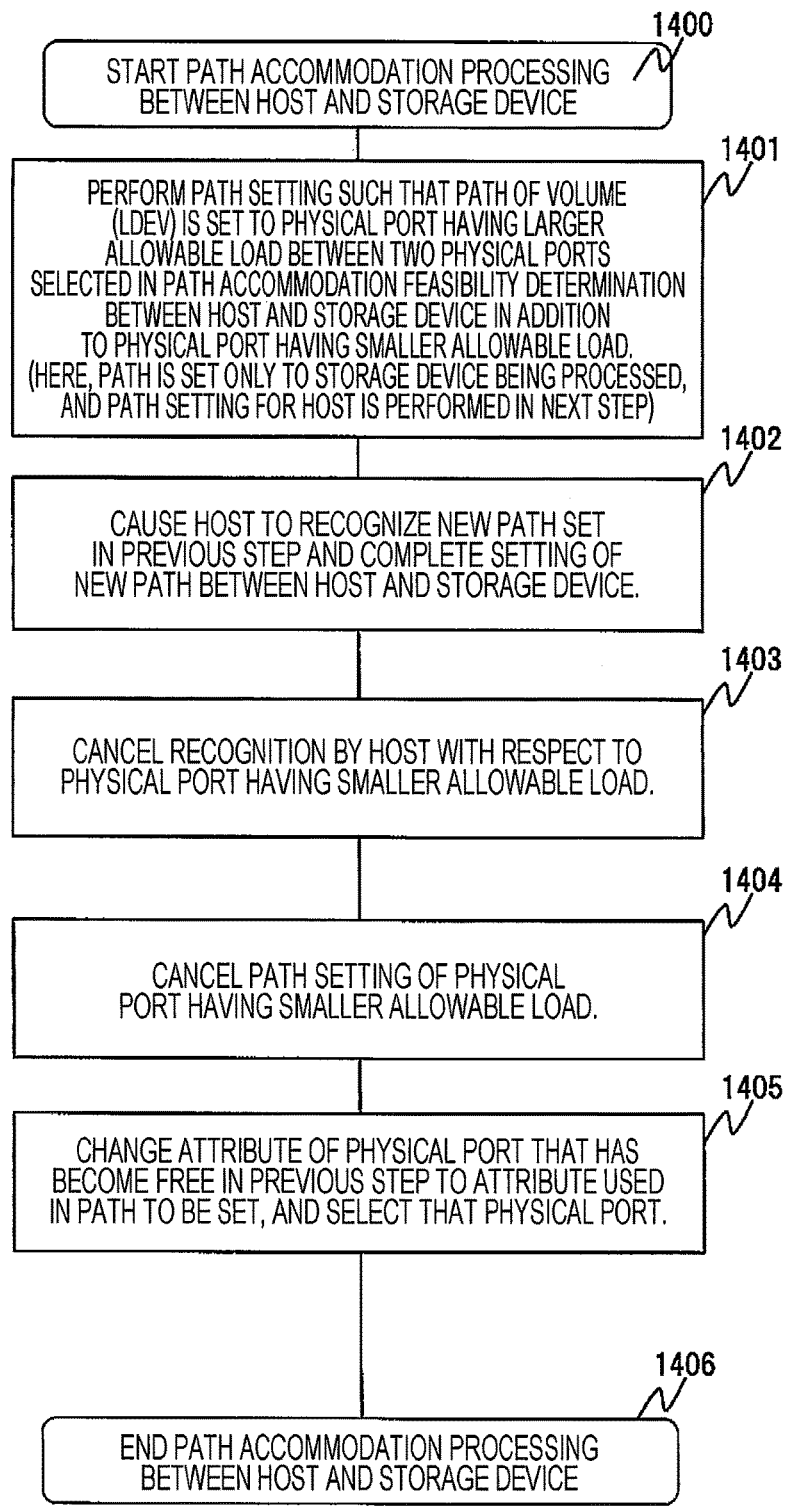
FIG. 18 is a flowchart illustrating an example of the path accommodation processing between host and storage device of the band accommodation processing according to the first embodiment of the present invention.

FIG. 18 is an example of a flowchart illustrating the detail of the path accommodation processing between host and storage device. The path accommodation processing between host and storage device is started by step 910 (step 1400). Each step performed in the path accommodation processing between host and storage device will be described below.

Step 1401: the path management program 210 performs path setting such that the path of all the LDEVs 521 is set to the physical port 502 having the larger allowable load between the two physical ports 502 selected in step 1203 in addition to the physical port 502 having the smaller allowable load. Note that this path setting is performed only on the storage device 500 selected in step 902. Accordingly, the path between host and storage device is not formed completely where the path of the physical port 502, the LU 520, and the LDEV 521 is set only on the side of the storage device 500 but is not recognized by the host computer 100.

Step 1402: the path management program 210 causes the host computer 100 to recognize the path set to the storage device 500 in step 1401 and forms the path between host and storage device. All the LDEVs 521 that are path-set to the physical port 502 having the smaller allowable load are connected to the host computer 100 through the physical port 502 having the larger allowable load.

Step 1403: the path management program 210 cancels the recognition by the host computer 100 recognizing all the paths to the physical port 502 having the smaller allowable load.

Step 1404: the path management program 210 deletes, from the storage device 500, all the paths to the physical port 502 having the smaller allowable load.

Step 1405: the attribute of the physical port 502 that has become a free physical port in step 1404 is changed to the attribute used by the path to be set so that the physical port is selected to thereafter end the path accommodation processing between host and storage device (step 1406).

Note that the band accommodation processing is triggered when the user sets the new path between storage devices or between host and storage device in the aforementioned description, but may also be triggered when the data migration is completed or when the load is changed.

There will be described an example where the processing is triggered by the completion of the data migration. The processing based on this trigger uses the physical port, which is not used anymore with the completion of the data migration, for the purpose of increasing the band of the existing path that is in an overload status. Specifically, there will be described an example where data in the LDEV 521C is migrated to the LDEV 521F as illustrated in FIG. 11.

The host computer 100A and the host computer 100B can transmit an I/O command to either the path between host and storage device of the LDEV 521C through the physical port 502C or the path between host and storage device of the LDEV 521F through the physical port 502H while data is being migrated. Upon completion of the data migration, the path between host and storage device of the LDEV 521C through the physical port 502C is not used. The storage device 500A thus sends a blocking notification of the path to the host computer 100A at the point when the data migration is completed. This blocking notification is implemented by an SCSI command, for example. As a result, it is ensured that the path is not used by the host computer 100A.

After the blocking notification of the path is sent, the storage device 500A deletes the path set among the physical port 502C, the LU 520, and the LDEV 521C. The path management program 210 on the management server 200 is triggered by the completion of data migration and the path blocking notification illustrated above and starts the band accommodation processing on the storage device 500A (corresponding to steps 900 and 901).

In the path accommodation necessity determination performed in step 903, the path management program 210 calculates a ratio of the current load to the allowable load (current load/allowable load) of all the physical ports 502 of the storage device 500A before executing step 1001 and, when any of the physical ports 502 has the ratio exceeding a predetermined threshold, considers the physical port 502 as overloaded. The path management program 210 then determines that the path needs to be reinforced and executes the remaining flow and step 904 onward of the path accommodation necessity determination while treating a path for the path reinforcement as the path to be set. Note that the processing ends here when none of the physical ports 502 is overloaded.

When the processing gets to the path accommodation feasibility determination between host and storage device of step 907, the path management program 210 selects the physical port 502C of the path, which is blocked following the completion of the data migration, as available for accommodation. In the path accommodation processing between host and storage device in step 910, the path set to the physical port 502C being selected is deleted so that the port is now a free physical port. In the path setting processing performed in step 913, the same path setting is performed on the selected physical port 502C in order to reinforce the path set to the overloaded physical port 502. As a result, the I/O with respect to the overloaded physical port 502 can be dispersed to the physical port 502C.

Second Embodiment

A second embodiment according to the present invention will be described with reference to FIGS. 1 to 3, 5, 8, 13, and 19 to 31. Note that there are roughly two differences between the present embodiment and the second embodiment. The first difference is the use of a virtual port, which is to be described below, in addition to a physical port. The second difference is the use of a virtual storage device to be described below.

A system configuration of the present embodiment is similar to that of the first embodiment illustrated in FIGS. 1 to 3. A memory configuration of a host computer 100 illustrated in FIG. 5 is also similar to that of the first embodiment, but an alternate path management program 110 does not necessarily have to be provided. Moreover, physical port information 600 illustrated in FIG. 8 is similar to that of the first embodiment. Band accommodation processing illustrated in FIG. 13 is similar to that of the first embodiment as well. However, detailed processing such as a path accommodation necessity determination included in the band accommodation processing is different from that of the first embodiment. The present embodiment will be described below with reference to FIGS. 19 to 31 illustrating the difference from the first embodiment.

Figure 19:
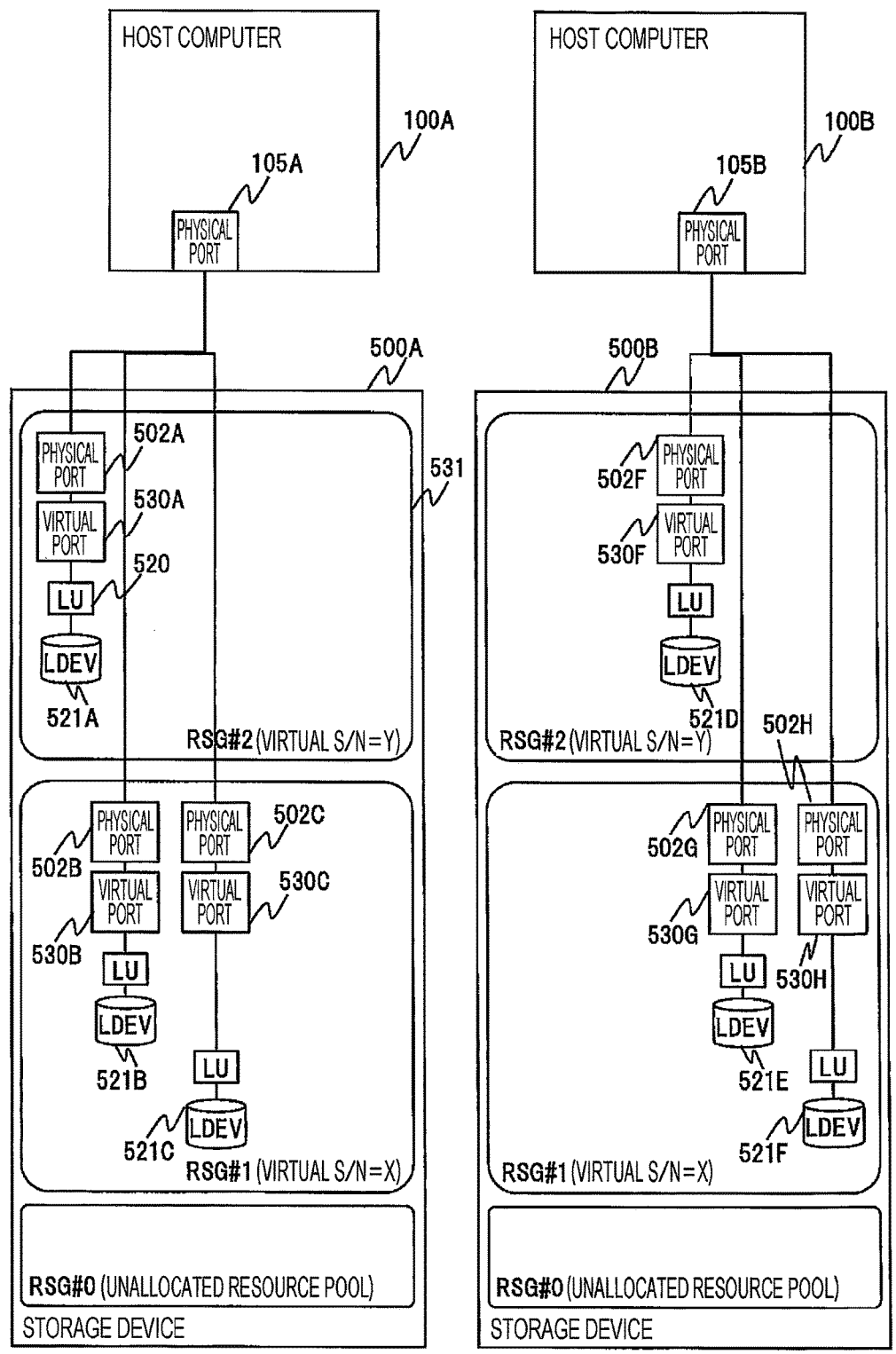
FIG. 19 is a diagram illustrating an example of a logical configuration of an IT system according to a second embodiment of the present invention.

FIG. 19 is a diagram illustrating a configuration of a logical connection between the host computer 100 and a storage device 500. The storage device 500 includes a virtual port 530 and a resource group (RSG in the FIG. 531 in addition to a physical port 502, an LU (Logical Unit) 520, and an LDEV (Logical Device) 521. The virtual port 530 is a virtual port set to the physical port 502. Specifically, for example, Fibre Channel has a function which realizes an additional virtual port called NPIV (N Port ID Virtualization). One or more of the virtual ports 530 can be set to each physical port 502. As with the physical port 502, the virtual port 530 has a WWN and a SAN address (Port_ID for the Fibre Channel). Note that the WWN of the virtual port 530 is a value calculated and set by the storage device 500 from a serial number of the virtual storage device to be described below and a virtual port number to be described below, for example. Moreover, one or more of the LUs 520 can be associated with the virtual port 530. When the virtual port 530 is used, the host computer 100 specifies a destination Port_ID of the virtual port 530 instead of a destination Port_ID of the physical port 502 in transmitting a frame. It is however the physical port 502 which actually receives the frame. A path provided from a physical port 105 of the host computer 100 to an LDEV 521 through the virtual port 530 and the LU 520 set to the physical port 502 of the storage device 500 is hereinafter referred to as a path between host and storage device.

A path between storage devices is formed in a manner similar to how the path between host and storage device is formed. That is, a path of the LDEV 521, the LU 520, and the virtual port 530 set to the physical port 502 is set in one storage device 500A, while another storage device 500B is formed by recognizing the path.

The resource group 531 is a unit which splits the resources (such as the LDEV, the LU, the virtual port, and the physical port). A user who has the authority to operate the resources in the resource group is set for each resource group 531. Information related to the operation authority of the user is called user access control information, which is held in the storage device 500. Moreover, each resource group 531 has a virtual serial number (or a virtual S/N in the figure, which will be hereinafter referred to as a virtual serial number as well). A virtual identifier can be assigned to the resources in the resource group 531. The user can designate, to the storage device 500, a resource to be operated by means of the virtual serial number and the virtual identifier when performing an operation such as path setting and volume formatting. Upon receiving the designation, the storage device 500 searches for an actual identifier in the storage device 500 on the basis of the virtual serial number and the virtual identifier and executes the user operation. In other words, the user can perform the operation without being aware of which resource is physically the resource to be operated by designating the virtual serial number and the virtual identifier. A group of resources that can be operated by one virtual serial number and each virtual identifier is called the virtual storage device. The virtual storage device corresponds with the resource group 531 when one storage device 500 is provided. When each resource group 531 of each of a plurality of the storage devices 500 has the same virtual serial number, the user can treat the plurality of resource groups 531 as one virtual storage device.

When one virtual storage device includes the plurality of storage devices 500 as described above, the user gives an operation instruction by designating the virtual serial number and the virtual identifier through a management server 200. The management server 200 identifies the storage device 500 in which the resource to be operated is actually present, and transmits an instruction. Accordingly, the user can perform the operation without being aware of the storage device 500 in which the resource to be operated is actually present. Note that the processing of identifying the storage device 500 in which the resource to be operated is actually present and transmitting the instruction may be executed by the storage device 500 or the host computer 100 instead of the management server 200. Moreover, in the present embodiment, a user who manages the virtual storage device is called a virtual storage manager while a user who manages the entire storage device 500 is called a physical storage manager, thereby distinguishing each user. The physical storage manager has the authority to perform all operations pertaining to the storage device 500 such as the allocation of the resource and the virtual serial number to the resource group 531. On the other hand, the virtual storage manager has the authority to manage only the resource that can be operated by the virtual identifier allocated to the virtual storage. The virtual identifier can be assigned to the LDEV 521, the LU 520, the physical port 502, and the like. Here, there will be described the virtual port number being the virtual identifier of the physical port 502 which is required in describing the present embodiment. By assigning the virtual port number to the physical port, the virtual storage manager can identify the physical port as the virtual port. That is, when the virtual port number is assigned to the physical port 502, a new virtual port 530 having a WWN calculated from the virtual serial number and the virtual port number is generated so that information on the virtual port 530 is held on the storage device 500. Moreover, the WWN and the Port_ID are registered when the storage device 500 sends a login request to a SAN switch 300. Note that a plurality of virtual port numbers can be assigned to the physical port 502.

Moreover, as described later, the resource group 531 has a resource group ID that is an identifier within the storage device 500. Note that the resource group 531 having the resource group ID of "0" in the present embodiment is a resource group to which a resource not allocated to another resource group 531 belongs. The resource group 531 having the resource group ID of "0" is also referred to as an unallocated resource pool. A resource shared with another resource group 531 also belongs to this resource group 531. When the physical storage manager performs data migration from the LDEV 521C to the LDEV 521F, for example, it is required that the virtual storage manager see the data migration as being performed within a single storage device since the two LDEVs 521 are provided in the same virtual storage device. Therefore, in order to perform the data migration from the LDEV 521C to the LDEV 521F, the virtual port 530 in the virtual storage device cannot be used so that a path is set by using the physical port 502 within the resource group 531 having the resource group ID of "0".

Figure 20:
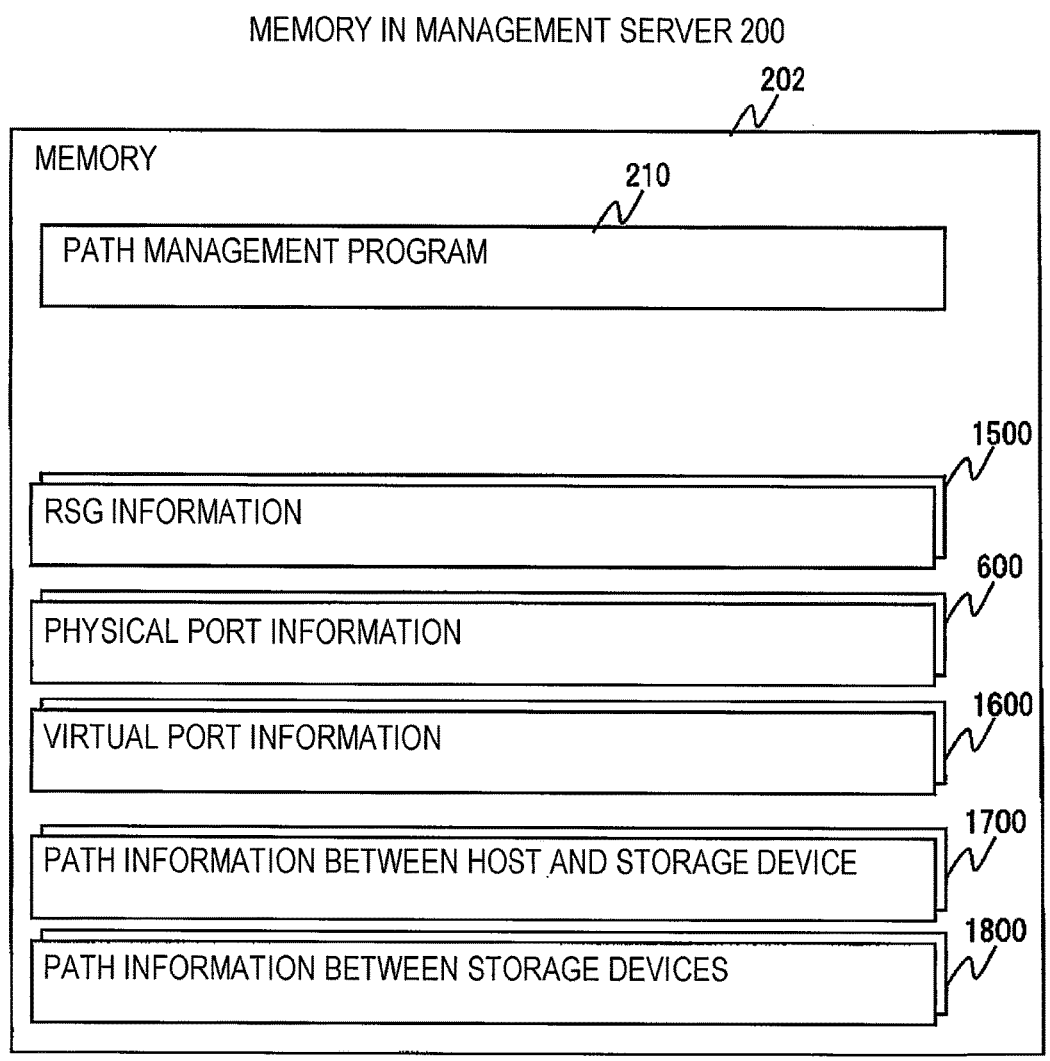
FIG. 20 is a diagram illustrating an example of a configuration of a memory on a management server according to the second embodiment of the present invention.

When setting the remote copy path with another storage device 500, on the other hand, the virtual storage manager externally connects the virtual storage device and thus uses the virtual port 530 within the virtual storage device. FIG. 20 illustrates a configuration of a memory 202 on the management server 200. The memory 202 stores a path management program 210, resource group information 1500, physical port information 600, virtual port information 1600, path information between host and storage device 1700, and path information between storage devices 1800. Note that the memory 202 may also store another program or information.

Figure 21:
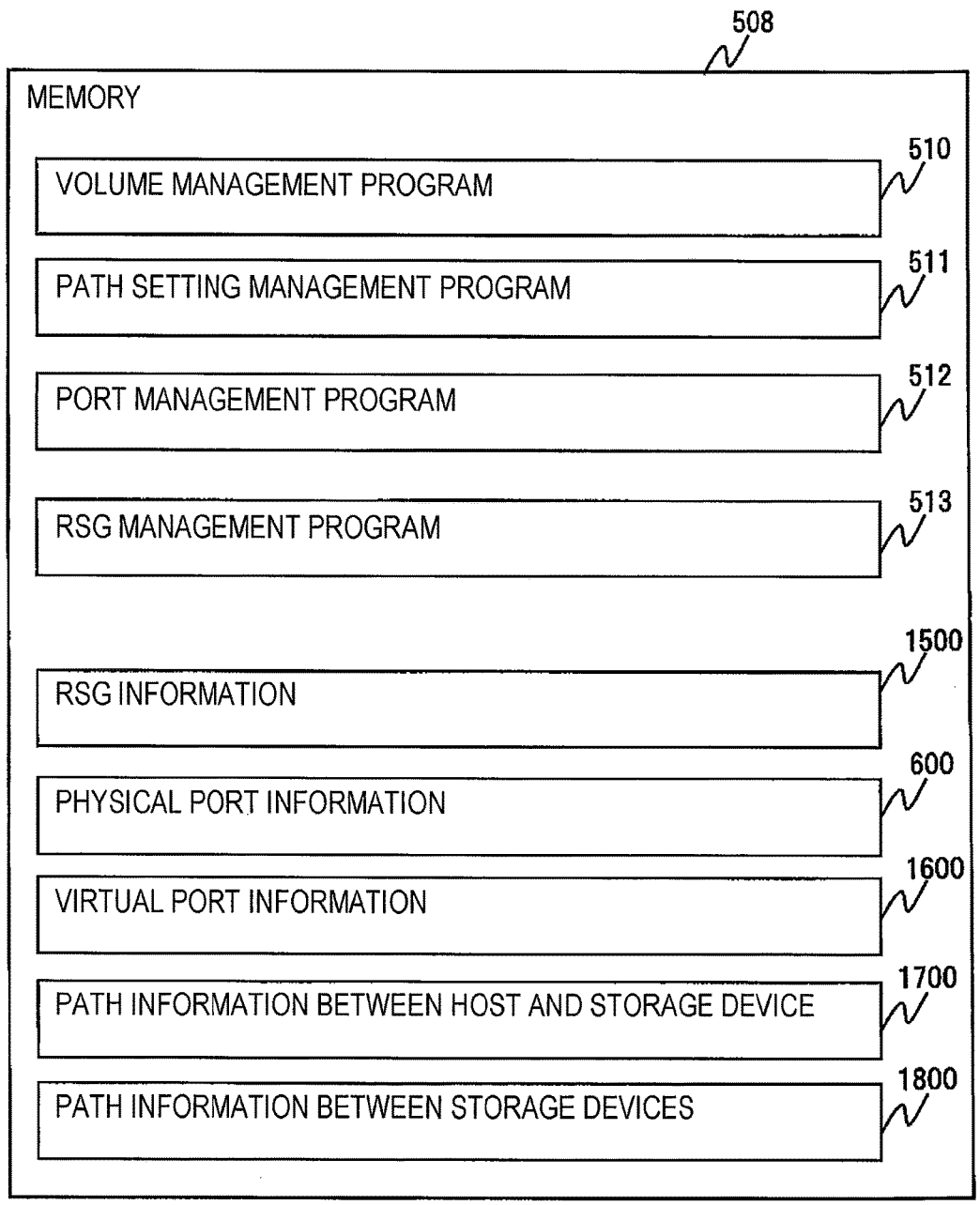
FIG. 21 is a diagram illustrating an example of a configuration of a memory on a storage device according to the second embodiment of the present invention.

FIG. 21 illustrates a configuration of a memory 508 on the storage device 500. The memory 508 stores a volume management program 510, a path setting management program 511, a port management program 512, a resource group management program 513, resource group information 1500, physical port information 600, virtual port information 1600, path information between host and storage device 1700, and path, information between storage devices 1800. The resource group management program 513 executes processing related to the resource group 531 such as allocation of the resource to the resource group 531, assignment of a virtual serial number, and assignment of a virtual identifier to the resource.

FIG. 2(a) is a table illustrating an example of the resource group information 1500. The resource group information 1500 is formed of a resource group ID column 1501, a virtual serial number column 1502, an LDEV count column 1503, and a port count column 1504. An identifier of the resource group 531 is registered under the resource group ID column 1501. A virtual serial number 1502 set to the resource group 531 is registered under the virtual serial number column 1502. Registered under the LDEV count column 1503 are the number of LDEVs 521 allocated to the resource group 531 and the maximum number of LDEVs 521 that can be allocated to the resource group 531. Registered under the port count column 1504 are the number of physical ports 502 allocated to the resource group 531 and the maximum number of physical ports 502 that can be allocated to the resource group 531. Note that the maximum number is set by the physical storage manager.

FIG. 22(b) is a table illustrating an example of the virtual port information 1600. The virtual port information 1600 is formed of a physical port number column 1601, an affiliated resource group column 1602, a virtual port number column 1603, a virtual port WWN column 1604, a current load column 1605, and an allowable load column 1606. An identifier of the physical port 502 is registered under the physical port number column 1601. An identifier of the resource group 531 to which the physical port 502 belongs is registered under the affiliated resource group column 1602. An identifier of the virtual port 530 is registered under the virtual port number column 1603. A WWN corresponding to the virtual port number is registered under the virtual port WWN column 1604. A load of each virtual port 530 is registered under the current load column 1605. The maximum load allowed in the virtual port 530 is registered under the allowable load column 1606. Note that the maximum load is set by the physical storage manager. The virtual storage manager can also set the maximum load within the range set by the physical storage manager.

FIG. 23 is a table illustrating an example of the path information between host and storage device 1700. The path information between host and storage device 1700 is formed of an LDEV ID column 1701, a virtual port number column 1702, a LUN column 1703, a host port WWN column 1704, and a current load column 1705 but may include other information. The identifier of the LDEV 521 in the storage device 500 is registered under the LDEV ID column 1701. A virtual port number of a virtual port and an LUN, the path of each of which is set to the LDEV 521, are registered under the virtual port number column 1702 and the LUN column 1703, respectively. Note that the LUN is a number uniquely specifying the LU 520 of each virtual port 502, where there may be a duplicate number between different virtual ports 502. Registered under the host port WWN column 704 is a WWN of the physical port 105 of the host computer 100 forming the path between host and storage device while recognizing the virtual port 502 and the LU 520. A load of each path is registered under the current load column 705. Note that the sum of the values under the current load column 705 for all the paths between host and storage device of the virtual port 530 set to the same physical port 502 corresponds with the values under the current load column 604 of the physical port information 600.

FIGS. 24(a) to 24(c) are tables illustrating an example of the path information between storage devices 1800. The path information between storage devices 1800 is a general term for a data migration path (on the side of the storage device being a migration destination) illustrated in FIG. 10(a), a data migration path (on the side of the storage device being a migration destination) illustrated in FIG. 10(b), and remote copy path information 1830 illustrated in FIG. 24(c), for example.

Here, there will be described the remote copy path information 1830 that is the difference between the path information between storage devices 1800 and the path information between storage devices 800 of the first embodiment. FIG. 24(c) is the table illustrating the example of the remote copy path information 1830. The remote copy path information 1830 is formed of own storage information 1801C which is a piece of information of a path inside one of the storage devices 500, and external storage information 1802C which is a piece of information of another one of the storage devices 500 connected to the one storage device 500. The own storage information 1801C includes an LDEV ID column 1831, a virtual port number column 1832, and a current load column 1833. The external storage information 1802C includes a port WWN column 1834 and an LDEV ID column 1835. The own storage information 1801C and the external storage information 1802C may both include information besides what is described above. The identifier of the LDEV 521 in the storage device 500 is registered under the LDEV ID column 1831. The virtual port number of a virtual port, the path of which is set to the LDEV 521, is registered under the virtual port number column 1832. The load of each path is registered under the current load column 1833. Note that the sum of the values under the current load column for all the paths between storage devices of the virtual port 530 set to the same physical port 502 corresponds with the values under the current load column 604 of the physical port information 600. The WWN of the physical port 502 is registered under the port WWN column 1834. The identifier of the LDEV 521 in the storage device 500 is registered under the LDEV ID column 1835.

Figure 25:
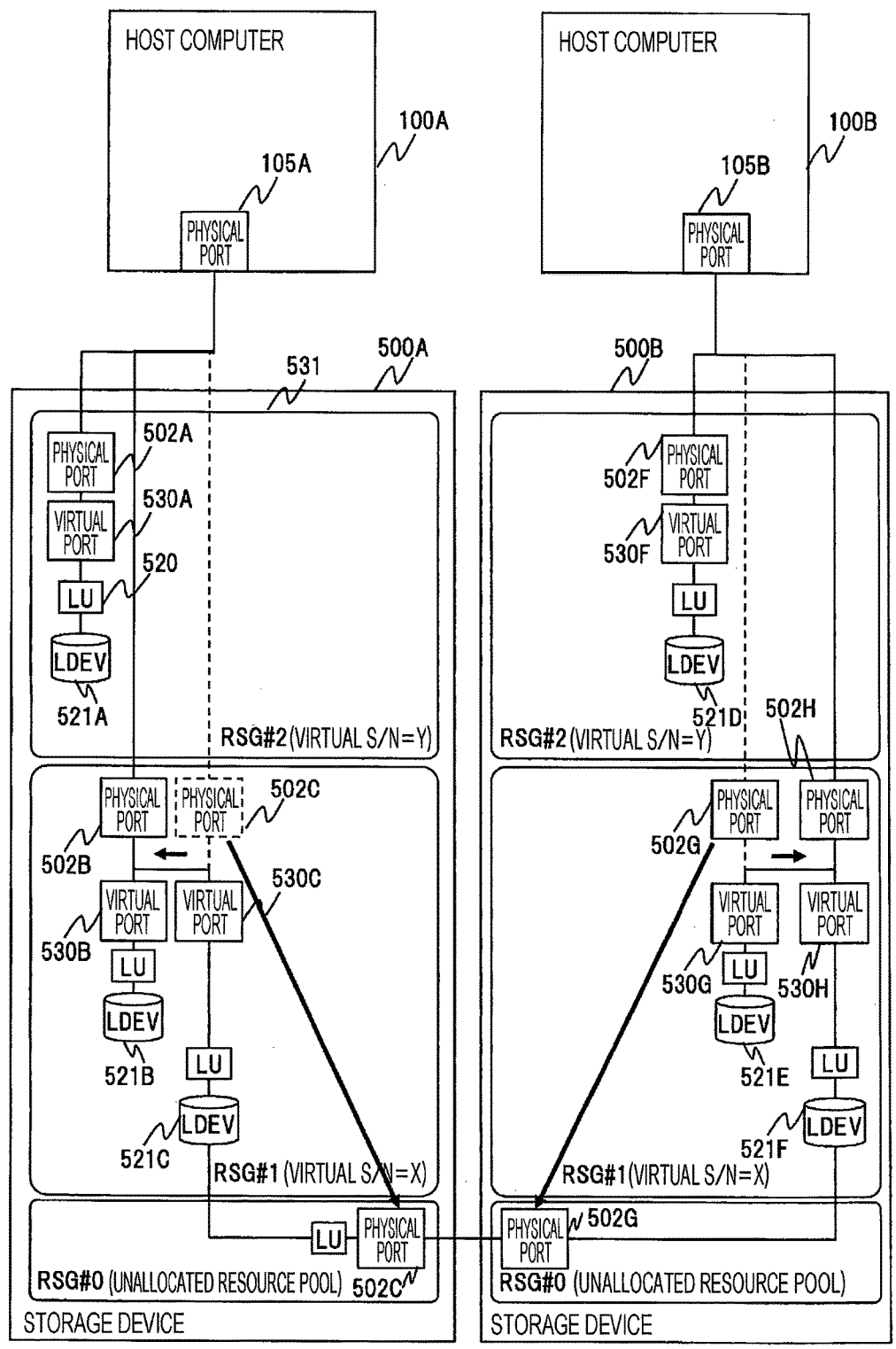
FIG. 25 is a schematic diagram illustrating an example of path accommodation processing between host and storage device as well as path setting processing according to the second embodiment of the present invention.

FIG. 25 is a schematic diagram illustrating an example of path accommodation processing between host and storage device as well as path setting processing according to the present embodiment. Each of the path accommodation processing between host and storage device and the path setting processing is executed during band accommodation processing to be described below.

FIG. 25 illustrates a case where the setting of an existing path between host and storage device is changed to secure a new physical port for the data migration path in order to set a new path between storage devices. (data migration path) used to migrate data in the LDEV 521C to the LDEV 521F, for example. Specifically, the path management program 210 on the management server 200 which has received an instruction from the physical storage manager gives an instruction to storage devices 500A and 500B, and changes setting such that a virtual port 530C set to a physical port 502C serves as a virtual port of a physical port 502B. The virtual port number, the WWN thereof, and a Port_ID associated with the WWN do not change with the shift of the virtual port 530. Moreover, a virtual port 530G set to a physical port 502G is shifted to a physical port 502H. Note that a method of shifting the virtual port 502 set to the physical port 502 and the LU 520 set to the virtual port 502 to another physical port 502 as with the case above is disclosed in JP 2009-146106 A.

The effect of performing the path accommodation processing between host and storage device by shifting the virtual port will be described. The virtual storage manager performs a management operation by only a virtual identifier of the resource. There can thus be presented, to the virtual storage manager, that the virtual storage device has not changed at all before and after setting the data migration path by shifting the virtual port 502 as described above. Moreover, a host computer 100A designates the Port_ID of the virtual port 530C when issuing an SCSI command so that the destination to which the SCSI command is issued need not be changed before and after setting the data migration path. This is the reason why the alternate path management program 110 is not required on the host computer 100A in the present embodiment.

The physical ports 502C and 502G are secured as free physical ports that can be used for the data migration path by the aforementioned path accommodation processing between host and storage device. The path management program 210 gives an instruction to the storage devices 500A and 500B and moves the physical ports 502C and 502G to the resource group 531 having the resource group ID of "0". Moreover, the LDEV 521C and the LDEV 521F are connected by a data migration path through the physical ports 502C and 502G and the LU 520 under the physical port 502C. Note that while these processings have been described to employ a method in which the path management program 210 on the management server 200 gives the instruction to the storage device 500, the processings may also employ a method in which one of the plurality of storage devices 500 gives an instruction to another one of the storage devices 500.

The band accommodation processing will be described below. The overall flowchart of the band accommodation processing is similar to what is illustrated in FIG. 13 of the first embodiment. Moreover, the physical storage manager is assumed to be a manager who gives the instruction to the management server 200 and executes the band accommodation processing. The condition of the processing described below changes when the instruction is given by the virtual storage manager, which will be described later.

Figure 26:
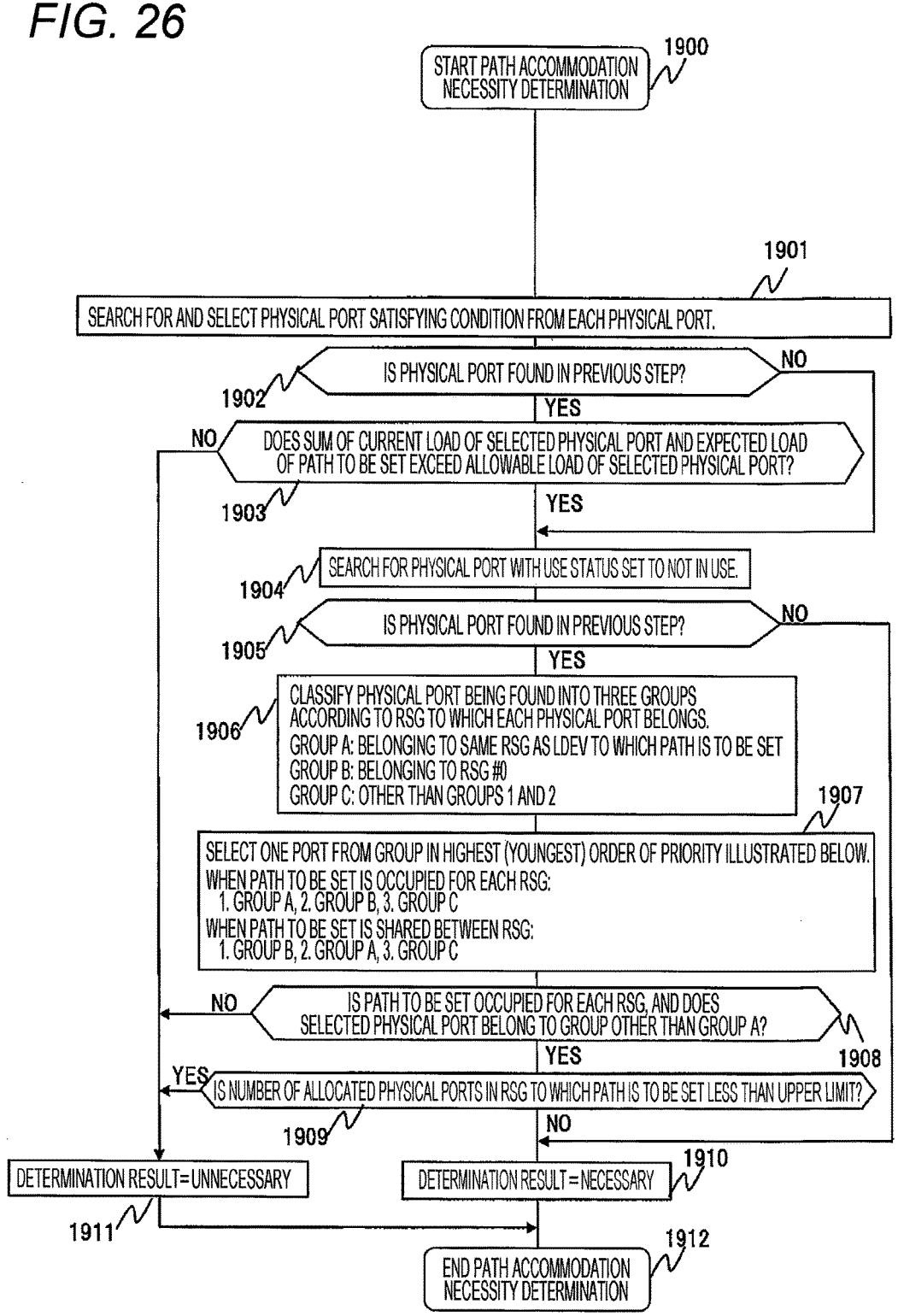
FIG. 26 is a flowchart illustrating an example of path accommodation necessity determination processing of band accommodation processing of an entire storage system according to the second embodiment of the present invention.

FIG. 26 is an example of a flowchart illustrating the detail of the path accommodation necessity determination according to the present embodiment. The path accommodation necessity determination is, started by step 903 (step 1900). Note that this determination processing is executed on the basis of the physical port information 600, the path information between host and storage 1700, the path information between storage devices 1800, the resource group information 1500, and the virtual port information 1600 of the storage device 500 that is selected in step 902, unless otherwise specified. Each step performed in the path accommodation necessity determination will be described below.

Step 1901: the path management program 210 searches for a physical port which satisfies the following condition.

Condition 1: a, physical port used for the existing path between storage devices when the path to be set is the path between storage devices. A physical port used for the existing path between host and storage device when the path to be set is the path between host and storage device.

Condition 2: "a physical port with the attribute corresponding with the attribute used for the path to be set."

Condition 3: a physical port belonging to the same resource group 531 as the LDEV 521 to which the path is set, when the path to be set is occupied for each resource group 531. A physical port belonging to the resource group 531 with the resource group ID of "0", when the path to be set is shared between the resource groups 531.

When the physical port 520 is found as a result of the search, the one having the lowest current load is selected.

Step 1902: the path management program 210 proceeds to step 1903 when the physical port 502 is found in step 1901. On the other hand, the path management program 210 proceeds to step 1904 when the physical port 502 is not found in step 1901.

Step 1903: the path management program 210 determines whether or not the sum of the current load of the physical port 502 selected in step 1901 and an expected load of the path to be set exceeds the allowable load of the physical port 502 being selected, and proceeds to step 1904 when the sum exceeds the allowable load or proceeds to step 1907 when the sum does not exceed the allowable load.

Step 1904: the path management program 210 searches for a free physical port (the physical port 502 with the use status corresponding to "not in use"). Note that the status "not in use" in the present embodiment indicates that no virtual port 530 is set and the path setting is not performed.

Step 1905: the path management program 210 proceeds to step 1906 when the physical port 502 is found in step 1904 or proceeds to step 1910 when the physical port is not found.

Step 1906: the path management program 210 groups the free physical port 502 found in step 1904 on the basis of the resource group 531 to which the physical port belongs. Note that the group here is formed for the execution of the processing and is different from the resource group 531.

Group A: a physical port which belongs to the same resource group 531 as the resource group 531 to which the path is to be set.

Group B: a physical port which belongs to the resource group 531 with the resource group ID of "0".

Group C: a physical port classified into neither the group A nor the group B.

Step 1907: the path management program 210 selects one of the physical ports 502 in the order of priority of Groups A, B, and C when the path to be set is occupied for each resource group 531. The free physical port 502 in Group B is selected when no free physical port 502 exists in Group A while one free physical port 502 exists in each of Groups B and C, for example. Moreover, the path management program selects one of the free physical ports 502 in the order of priority of Groups B, A and C when the path to be set is shared between the resource groups 531. Note that the path management program may consider the free physical port 502 as nonexistent when the free physical port is in the group of the low order of priority. The processing proceeds to step 1910 when free physical port 502 is found as a result of ignoring the group in the low order in performing the selection.

Step 1908: the path management program 210 proceeds to step 1909 when the path to be set is occupied for each resource group 531 and the physical port 502 selected in step 1907 belongs to a group other than Group A. The processing proceeds to step 1911 in another case.

Step 1909: the path management program 210 refers to the RSG information 1500 and proceeds to step 1911 when the number of physical ports 502 already allocated to the resource group 531 to which the path is to be set is less than the maximum number of ports that can be allocated. The processing proceeds to step 1910 in another case. Note that the number of physical ports 502 already allocated as well as the maximum number of ports that can be allocated are stored under the port count column 1504 of the resource group information 1500.

Step 1910: the path management program 210 outputs "necessary" as the determination result and ends the path accommodation necessity determination (step 1912).

Step 1911: the path management program 210 outputs "unnecessary" as the determination result and ends the path accommodation necessity determination (step 1912).

Figure 27:
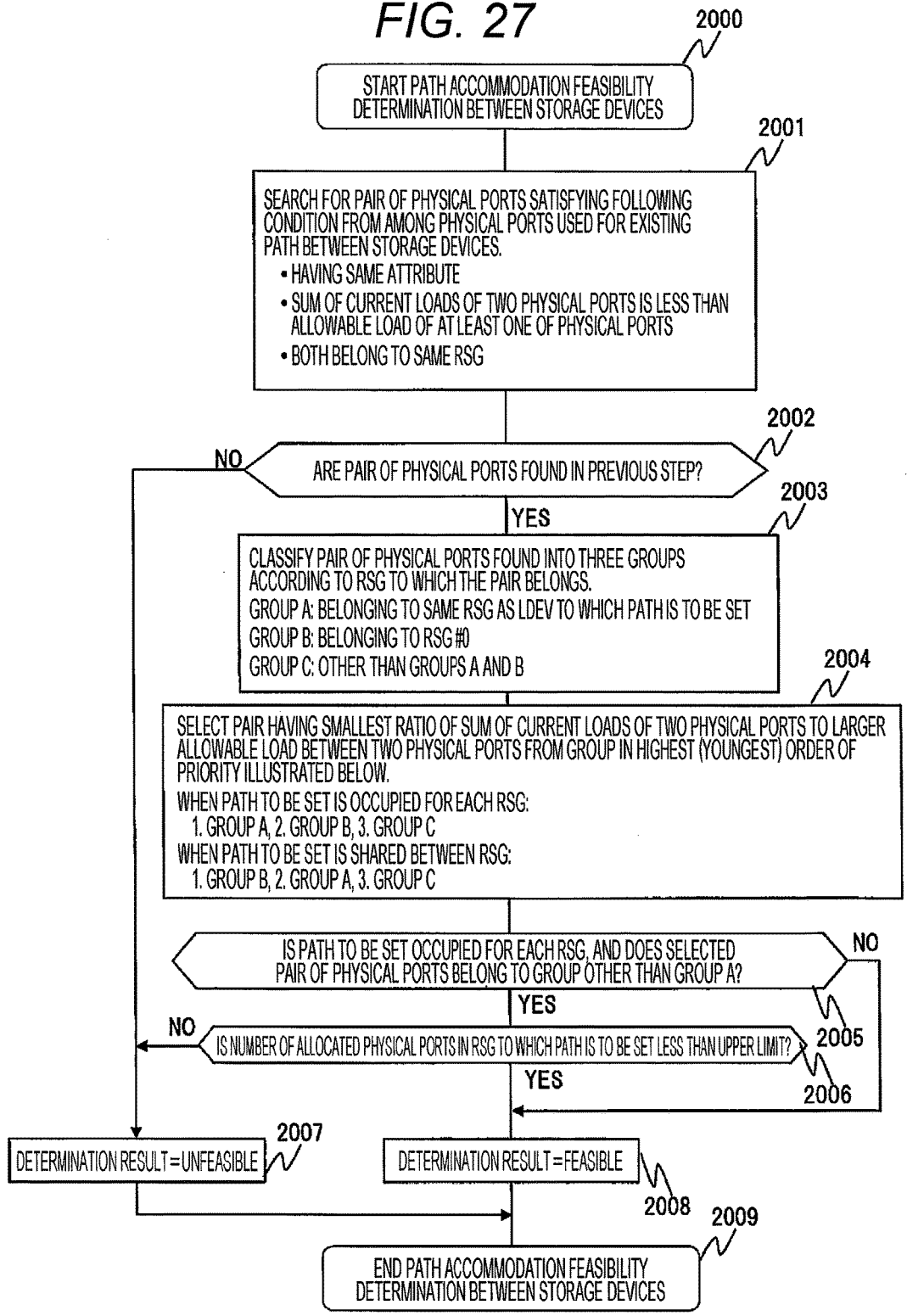
FIG. 27 is a flowchart illustrating an example of path accommodation feasibility determination processing between storage devices of the band accommodation processing according to the second embodiment of the present invention.

FIG. 27 is an example of a flowchart illustrating the detail of the path accommodation feasibility determination between storage devices and the path accommodation feasibility determination processing between host and storage device.

The path accommodation feasibility determination between storage devices is started by step 905 (step 2000). The path accommodation feasibility determination between host and storage device is started by step 907 (step 2100). Note that this determination processing is executed on the basis of the physical port information 600, the path information between host and storage 1700, the path information between storage devices 1800, the resource group information 1500, and the virtual port information 1600 of the storage device 500 that is stored in the memory 202 of the management server 200 and selected in step 902, unless otherwise specified. Each step performed in the path accommodation feasibility determination between storage devices and the path accommodation feasibility determination between host and storage device will be described below.

Step 2001: the path management program 210 searches for a pair of two of the physical ports 502 satisfying the following condition from the physical ports 502 used in the existing path between storage devices in the path accommodation feasibility determination between storage devices, or from the physical ports 502 used in the existing path between host and storage device in the path accommodation feasibility determination between host and storage device.

Condition 1: a pair of two of the physical ports 502 "having the same attribute";

Condition 2: a pair of two of the physical ports 502 where "the sum of the current loads of the two physical ports 502 is less than the allowable load of at least one of the physical ports"; and Condition 3: a pair of two of the physical ports 502 "belonging to the same resource group 531".

Step 2002: the path management program 210 proceeds to step 2003 when the pair of physical ports 502 are found in step 2001 or proceeds to step 2007 when the pair of physical ports are not found. Note that each step performed from here on in the path accommodation feasibility determination between storage devices and the path accommodation feasibility determination processing between host and storage device will be the same.

Step 2003: the path management program 210 groups the pair of physical ports 502 found in step 2001 according to the resource group 531 to which the pair belongs. The pair belonging to the same resource group 531 as the LDEV 521 to which the path is to be set is classified into Group A. The pair belonging to the resource group 531 with the resource group ID of "0" is classified into Group B. The pair classified into neither Group A nor B is classified into Group C.

Step 2004: the path management program 210 selects one of the pairs of physical ports 502 in the order of priority of Groups A, B, and C when the path to be set is occupied for each resource group 531. Moreover, the path management program selects one of the pairs of physical ports 502 in the order of priority of Groups B, A and C when the path to be set is shared between the resource groups 531. Note that when a plurality of the pairs of physical ports 502 exists in one group, the path management program selects the pair having the smallest ratio of the sum of the current loads of the two physical ports 502 to the larger one of the allowable loads of the two physical ports 502 (the sum of current load/the larger allowable load). The selection within the group may be made according to another criterion or made at random. Note that the path management program may consider the free physical port 502 as nonexistent when the free physical port is in the group in the low order of priority. The processing proceeds to step 2007 when no pair of physical ports 502 is found as a result of ignoring the group in the low order in performing the selection.

Step 2005: the path management program 210 proceeds to step 2006 when the path to be set is occupied for each resource group 531 and the pair of physical ports 502 selected in step 2004 belong to a group other than Group A. The processing proceeds to step 2008 otherwise.

Step 2006: the path management program 210 proceeds to step 2008 when the number of physical ports 502 already allocated to the resource group 531 to which the path is to be set is less than the maximum number of ports that can be allocated. The processing proceeds to step 2007 otherwise.

Step 2007: the path management program 210 outputs "unfeasible" as the determination result and ends the path accommodation feasibility determination between storage devices (step 2009).

Step 2008: the path management program 210 outputs "feasible" as the determination result and ends the path accommodation feasibility determination between storage devices (step 2009).

Figure 28:
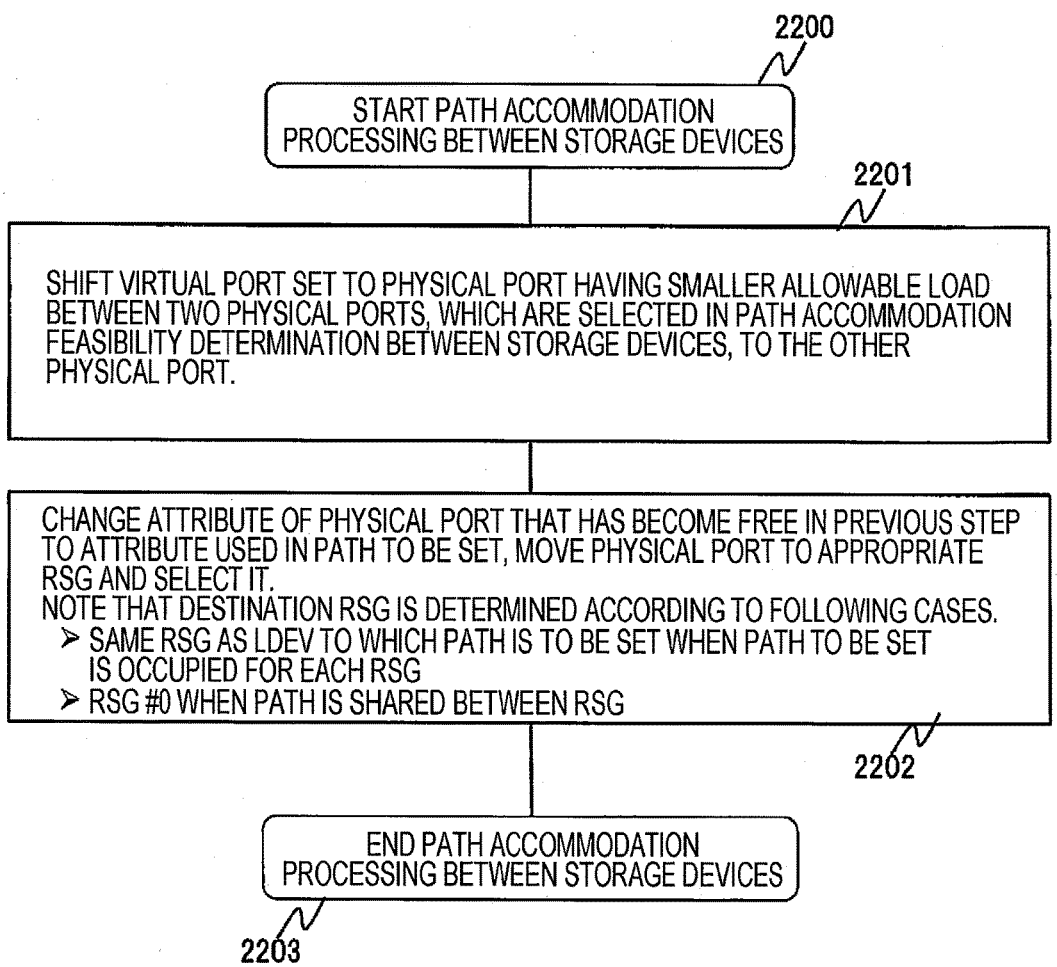
FIG. 28 is a flowchart illustrating an example of path accommodation processing between storage devices of the band accommodation processing according to the second embodiment of the present invention.

FIG. 28 is an example of a flowchart illustrating the detail of the path accommodation processing between storage devices and the path accommodation processing between host and storage device. The path accommodation processing between storage devices is started by step 909 (step 2200). Each step performed in the path accommodation processing between storage devices will be described below. Note that each step performed in the path accommodation processing between host and storage device is similar to that in the path accommodation processing between storage devices except that the path accommodation processing between host and storage device is started by step 910 (step 2300) and that the two physical ports to be subjected to determination in step 2201 are selected in the path accommodation feasibility determination processing between host and storage device.

Step 2201: the path management program 210 shifts all the virtual ports 530 set to the physical port 502, having the smaller allowable load between the two physical ports 502 selected in step 2004, to the other physical port 502. The physical port 502 having the smaller allowable load therefore becomes a free physical port.

Step 2202: the path management program 201 changes the attribute of the physical port 502 that has become the free physical port in step 2201 to the attribute used by the path to be set, moves the physical port to an appropriate resource group 531, selects the physical port 502, and ends the path accommodation processing between storage devices (step 2203). Note that the resource group to which the physical port is moved is the same resource group 531 as the LDEV 521 to which the path is to be set, when the path to be set is occupied for each resource group 531. Moreover, the resource group corresponds to the resource group 531 with the resource group ID of "0", when the path to be set is shared between the resource groups 531.

The aforementioned band accommodation processing is executed when the physical storage manager gives the instruction to the management server 200 to set the new path between storage devices. In the present embodiment, there is also a case where the virtual storage manager gives the instruction to the management server 200 to set the new path between storage devices. In this case, the band accommodation processing applies only to the virtual storage device over which the virtual storage manager has the management authority.

REFERENCE SIGNS LIST

100: host computer
200: management server
500: storage device

The invention claimed is:

1. A storage system comprising:
   a storage device connected to an external storage device and which includes:
      a first processor configured to provide a plurality of logical storage devices to a host connected to the storage device,
      a storage medium on which the plurality of logical storage devices are based, and
      a plurality of ports which are interfaces between the host and the external storage device; and
   a management computer which includes:
      a second processor configured to manage connections between the host and each of the logical storage devices and the external storage device, and
      a memory configured to store port information of each of the plurality of ports including a use status, a current load, an allowable load, and an attribute of each of the plurality of ports, first path information indicating associations between the host and each of the plurality of logical storage devices and the plurality of ports including load information on a plurality of paths between the host and the logical storage devices, and second path information indicating associations between the external storage device and each of the plurality of logical storage devices and the plurality of ports including load information on a plurality of paths between the logical storage devices, and
   wherein the second processor is further configured to:
   when a new path is set to the paths between the host and the logical storage devices or to the paths between the logical storage devices, execute band accommodation processing on either the paths between the host and the logical storage devices or the paths between the logical storage devices on the basis of the port information, the first path information, and the second path information,
   wherein the band accommodation processing includes path accommodation feasibility determination processing,
   wherein the path accommodation feasibility determination processing includes:
   path accommodation determination processing between the external storage device and the logical storage devices to determine whether or not the use status of any of the plurality of ports can be changed to not-in-use by changing a setting of the paths between the logical storage devices, and
   when a result of the path accommodation determination between the external storage device and the logical storage devices is negative, path accommodation determination processing between the host and the logical storage devices to determine whether or not the use status of any of the plurality of ports can be changed to not-in-use by changing a setting of the paths between the host and the logical storage devices,
   wherein the path accommodation feasibility determination processing searches for a pair of the ports which have a same attribute and satisfy a condition that a sum of the current loads of the pair of the ports is less than the allowable load of at least one of the pair of the ports from among the plurality of ports on the basis of the port information, the first path information, and the second path information between storage devices, and, when the pair of ports are found, determines that band accommodation processing is feasible, and
   wherein, when the band accommodation processing is feasible, the band accommodation processing is performed on the either of the paths between the host and the logical storage devices or the paths between the logical storage devices according to the pair of ports found by the path accommodation feasibility determination processing.

2. The storage system according to claim 1, wherein the band accommodation processing includes:
   existing path usability determination processing of determining whether or not a new path can be set to a port in use among the plurality of ports, and free port presence determination processing of determining whether a free port is present among the plurality of ports, wherein the existing path usability determination processing includes:

performing a search for a port with an attribute corresponding with an attribute of the new path to be set from the ports used in the existing paths between the logical storage devices among the plurality of ports when the new path is between the logical storage devices, or from the ports used in the existing paths between the host and the logical storage devices among the plurality of ports when the new path between the host and the logical storage devices on the basis of the port information, first path information, second path information, an expected value of a load imposed on the new path, and the attribute of the new path, determining whether or not the new path can be set to the port of the search result on the basis of the current load on the port of the search result and the expected value of the load imposed on the new path, and the free port presence determination processing when it is determined that the new path cannot be set, and wherein the free port presence determination processing determines from the port information whether there exists a port not in use among the plurality of ports, and when it is determined that the port not in use is not present, the path accommodation feasibility determination is executed.

3. The storage system according to claim 1, wherein:

each of the plurality of ports and the logical storage devices belongs to a plurality of resource groups, the memory is further configured to store resource group information indicating to which of the plurality of resource groups each of the plurality of ports belongs, the path accommodation feasibility determination processing further searches for the pair of ports satisfying the condition, from among the plurality of ports, that the pair of ports belong to the same resource group, have the same attribute, and the sum of current loads of the pair of ports is less than the allowable load of at least one of the pair of the ports on the basis of the host information, the first path information, the second path information, and the resource group information, determines that the band accommodation processing can be performed when the pair of ports satisfying the condition are found, and, when a plurality of pairs of ports satisfying the condition are found, gives priority to one of the pairs of ports belonging to the resource group to which the logical storage devices subjected to path setting belong from among the logical storage devices.

4. The storage system according to claim 1, wherein the band accommodation processing is further executed when a change occurs in the current load of the paths between the host and the logical storage devices and the paths between the logical storage devices, a change occurs in setting and deletion of the paths between the host and the logical storage devices and the paths between the logical storage devices, or a shift of an operating state of a job using the paths between the host and the logical storage devices and the paths between the logical storage devices occurs.

5. A storage system comprising:

a management computer;

a first storage device connected to the management computer; and a second storage device connected to the management computer and the first storage device, wherein the first storage device and the second storage device are configured to be connected to a host, wherein the first storage device includes a first processor which provides a plurality of first logical storage devices to the host, a storage medium on which the plurality of first logical storage devices are based, and a plurality of first ports which are interfaces between the host and the second storage device, wherein the second storage device includes a second processor which provides a plurality of second logical storage devices to the host, a storage medium on which the plurality of second logical storage devices are based, and a plurality of second ports which are interfaces between the host and the first storage device, wherein the first processor and the second processor provide the first storage device and the second storage device as one virtual storage device to the host when the first processor and the second processor respond to the host as a storage having the same virtual product number, wherein the management computer includes third processor configured to manage connections between the host, the first storage device and the second storage device, and a memory configured to store port information including a use status, a current load, an allowable load, and an attribute of each of the plurality of first and second ports, first path information indicating associations of the plurality of first and second logical storage devices and the plurality of first and second ports between the host and each of the first storage device and the second storage device including load information on a plurality of paths between the host and each of the first storage device and the second storage device, and second path information indicating associations of the plurality of first and second logical storage devices and the plurality of first and second ports between the first storage device and the second storage device including load information on a plurality of paths between the first storage device and the second storage device, wherein the second processor is configured to:

when a new path is set to the paths between the host and the first and second logical storage devices or to the paths between the first logical storage devices and the second logical storage devices, execute band accommodation processing on the paths between the host and the first and second logical storage devices or the paths between the first and second logical storage devices on the basis of the port information, the first path information, and the second path information, wherein the band accommodation processing includes path accommodation feasibility determination processing, wherein the path accommodation feasibility determination processing includes:

path accommodation determination processing between the first and second storage devices to determine whether or not the use status of any of the plurality of first and second ports can be changed to not-in-use by changing settings of the paths between the first and second storage devices, and when a result of the path accommodation determination between the first and second storage devices is negative, path accommodation determination processing between the host and the first and second storage devices to determine whether or not the use status of any of the plurality of first and second ports can be changed to not-in-use by changing settings of the paths between the host and the first and second storage devices, and wherein the path accommodation feasibility determination searches for a pair of the ports which belong to a same one of the storage devices, have a same attribute and satisfy a condition that a sum of the current load of the pair of ports is less than the allowable load of at least one of the pair of ports from among the plurality of first and second ports on the basis of the host information, the path information between host and storage device, and the path information between storage devices and, when the pair of ports are found, determines that the band path accommodation is feasible, and wherein, when the band accommodation processing is feasible, the band accommodation processing is performed on the either of the paths between the host and the first and second logical storage devices or the paths between the first and second logical storage devices according to the pair of ports found by the path accommodation feasibility determination processing.

6. The storage system according to claim 5, wherein each of the plurality of first and second ports and the plurality of first and second logical storage devices belongs to a plurality of resource groups, the memory is further configured to store resource group information indicating to which of the plurality of resource groups each of the plurality of first and second ports belongs, the path accommodation feasibility determination processing further searches for the pair of ports satisfying the condition, from among the plurality of first and second ports, that the pair of ports belong to the same one of the storage devices, belong to a same resource group, have the same attribute, and the sum of current loads of the ports is less than the allowable load of at least one of the pair of the ports on the basis of the port information, the first path information, the second path information, and the resource group information, determines that the band accommodation processing can be performed when the pair of ports satisfying the condition are found, and, when the pair of ports satisfying the condition are found, gives priority to one of the pairs of ports belonging to the resource group to which the logical storage devices subjected to path setting belong from among the plurality of first and second logical storage devices.

7. The storage system according to claim 5, wherein the band accommodation processing is further executed when a change occurs in the current load of the paths between the host and the first and second logical storage devices and the paths between the first and second logical storage devices, a change occurs in setting and deletion of the paths between the host and the first and second logical storage device and the paths between the first and second logical storage devices, or a shift of an operating state of a job using the paths between the host and the first and second logical storage devices and the paths between the first and second logical storage devices occurs.

8. The storage system according to claim 7, wherein the path accommodation feasibility determination processing between storage devices determines whether or not the use status of a port can be changed to not-in-use by changing setting of the port, among the plurality of first or second ports, which is used in data migration being completed, when the band accommodation processing is executed when the shift of the operating state of the job using the paths between the first and second logical storage devices and the completion of the data migration from the first logical storage device to the second logical device occurs.

* * * * *